US012587888B2

(12) United States Patent
Santhappan et al.

(10) Patent No.: US 12,587,888 B2
(45) Date of Patent: Mar. 24, 2026

(54) JOINT ACTIVATION OF CROSS-LINK INTERFERENCE MEASUREMENT AND REPORTING

(71) Applicant: QUALCOMM Incorporated, San Diego, CA (US)

(72) Inventors: Thomas Valerrian Pasca Santhappan, San Diego, CA (US); Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Seyedkianoush Hosseini, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 589 days.

(21) Appl. No.: 18/051,485

(22) Filed: Oct. 31, 2022

(65) Prior Publication Data

US 2024/0147278 A1     May 2, 2024

(51) Int. Cl.
 *H04W 24/10*      (2009.01)
 *H04B 17/336*    (2015.01)
 *H04W 24/08*      (2009.01)

(52) U.S. Cl.
 CPC ......... *H04W 24/10* (2013.01); *H04B 17/336* (2015.01); *H04W 24/08* (2013.01)

(58) Field of Classification Search
 CPC ..... H04W 24/10; H04W 24/08; H04B 17/336
 USPC ........................................................ 370/329
 See application file for complete search history.

(56) References Cited

U.S. PATENT DOCUMENTS

| | | | | |
|---|---|---|---|---|
| 11,356,860 | B2 * | 6/2022 | Takano .................... | H04B 7/06 |
| 11,438,785 | B2 * | 9/2022 | Shi ......................... | H04L 5/0048 |
| 11,825,322 | B2 * | 11/2023 | Wang .................... | H04L 5/0048 |
| 12,127,029 | B2 * | 10/2024 | Kim ...................... | H04B 17/345 |
| 12,132,528 | B2 * | 10/2024 | Ying ..................... | H04W 24/10 |
| 2021/0006438 | A1 * | 1/2021 | Harrebek .............. | H04W 24/10 |
| 2021/0067991 | A1 * | 3/2021 | Zhu ........................ | H04L 5/0051 |
| 2021/0144577 | A1 * | 5/2021 | Zhu ........................ | H04B 17/24 |
| 2021/0153053 | A1 * | 5/2021 | Taherzadeh Boroujeni ................ H04B 17/345 |
| 2022/0006501 | A1 * | 1/2022 | Kim ...................... | H04W 24/10 |
| 2022/0046459 | A1 * | 2/2022 | Kim ...................... | H04L 1/0026 |
| 2022/0116129 | A1 * | 4/2022 | Ying ..................... | H04B 7/0617 |
| 2022/0124531 | A1 * | 4/2022 | Miao ..................... | H04L 5/0051 |
| 2022/0303108 | A1 * | 9/2022 | Faxér .................... | H04L 5/1461 |
| 2022/0386156 | A1 * | 12/2022 | Park ...................... | H04W 24/10 |
| 2023/0189382 | A1 * | 6/2023 | Haustein ............... | H04W 76/20 370/329 |

(Continued)

FOREIGN PATENT DOCUMENTS

EP            3761742 B1 *  8/2023    ............ H04W 24/08

*Primary Examiner* — Mong-Thuy T Tran
(74) *Attorney, Agent, or Firm* — Holland & Hart LLP

(57) ABSTRACT

Methods, systems, and devices for wireless communications are described. The method may include a user equipment (UE) receiving a first message indicating a configuration for measuring cross-link interference (CLI) and for reporting one or more CLI measurements. Further, the UE may receive a second message activating the configuration. Upon receiving the second message, the UE may monitor a resource during a first periodic occasion and transmit a report comprising the one or more CLI measurements during a second periodic occasion.

27 Claims, 17 Drawing Sheets

(56)          References Cited

U.S. PATENT DOCUMENTS

| | | | |
|---|---|---|---|
| 2023/0319605 A1* | 10/2023 | Park | H04L 5/00 |
| | | | 370/252 |
| 2024/0064539 A1* | 2/2024 | Esswie | H04W 24/06 |
| 2025/0167902 A1* | 5/2025 | Li | H04L 5/0023 |

* cited by examiner

| R | R | S₇ | S₆ | S₅ | S₄ | S₃ | S₂ | S₁ | S₀ |

▨ CLI Report Configuration 415-a

▨ CLI Report Configuration 415-b

▨ CLI Report Configuration 415-c

▨ CLI Report Configuration 415-d

400

610

620

615

605

600

130    105    115

Network
Entity

Transceiver

1310

Antenna

1315

Communications
Manager

1320

Memory

Code

1330

1325

1340

Processor

1335

1305

1300

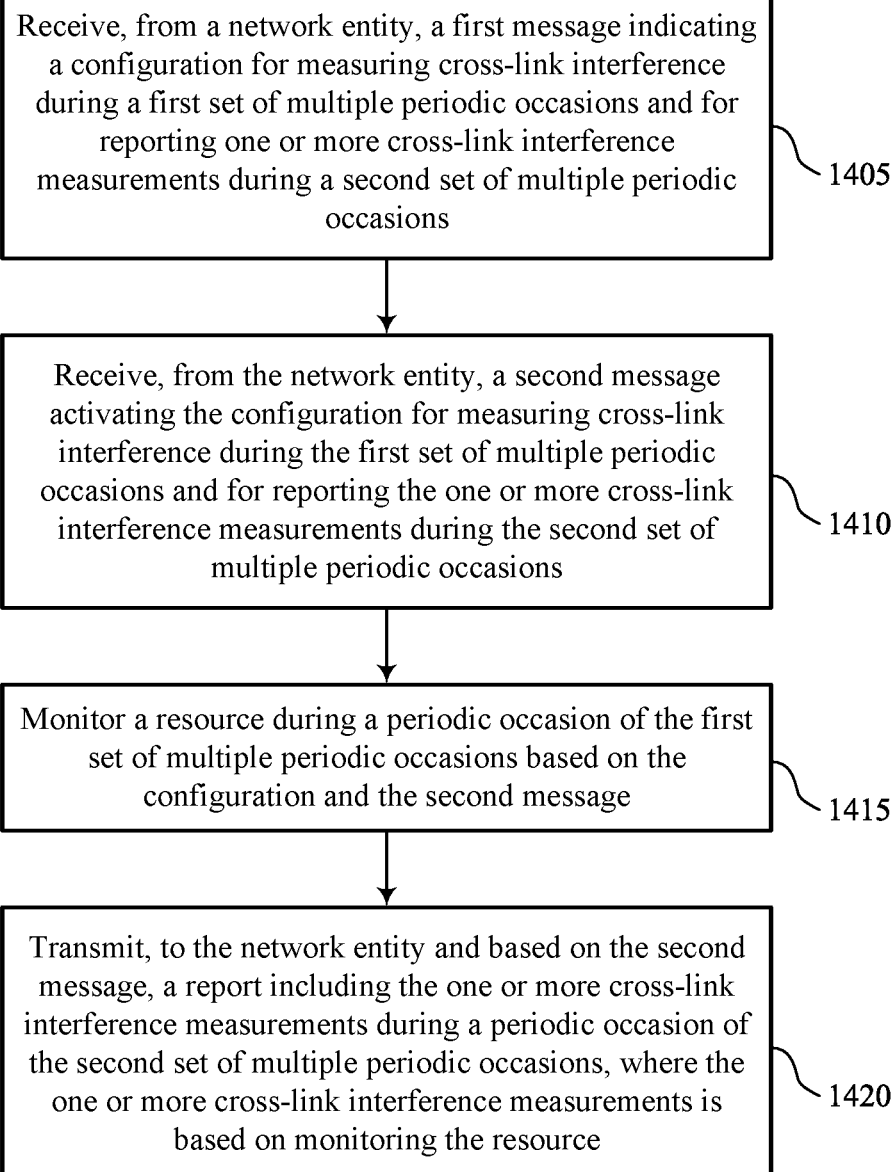

Receive, from a network entity, a first message indicating a configuration for measuring cross-link interference during a first set of multiple periodic occasions and for reporting one or more cross-link interference measurements during a second set of multiple periodic occasions

1405

Receive, from the network entity, a second message activating the configuration for measuring cross-link interference during the first set of multiple periodic occasions and for reporting the one or more cross-link interference measurements during the second set of multiple periodic occasions

1410

Monitor a resource during a periodic occasion of the first set of multiple periodic occasions based on the configuration and the second message

1415

Transmit, to the network entity and based on the second message, a report including the one or more cross-link interference measurements during a periodic occasion of the second set of multiple periodic occasions, where the one or more cross-link interference measurements is based on monitoring the resource

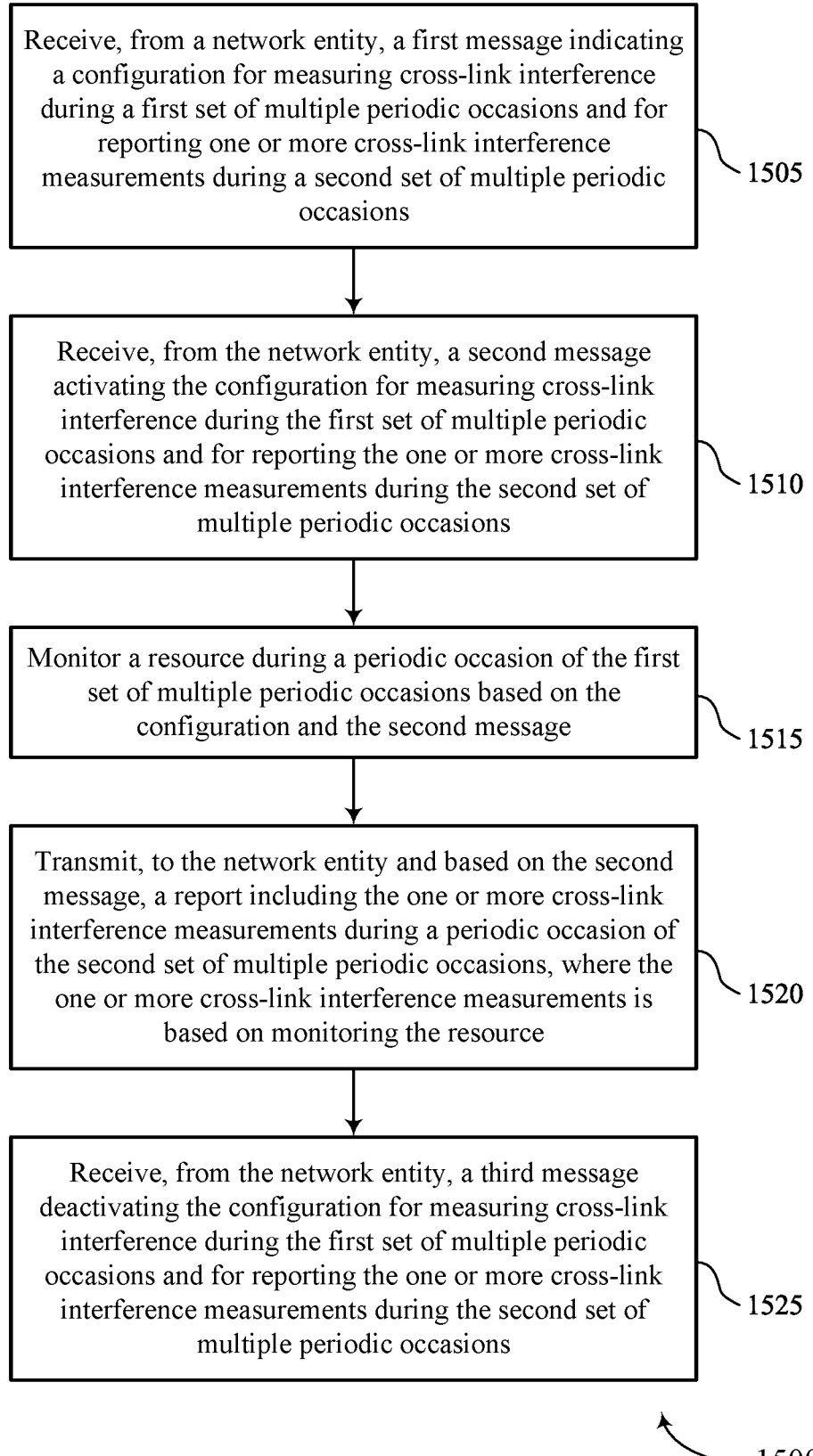

Receive, from a network entity, a first message indicating a configuration for measuring cross-link interference during a first set of multiple periodic occasions and for reporting one or more cross-link interference measurements during a second set of multiple periodic occasions

1505

Receive, from the network entity, a second message activating the configuration for measuring cross-link interference during the first set of multiple periodic occasions and for reporting the one or more cross-link interference measurements during the second set of multiple periodic occasions

1510

Monitor a resource during a periodic occasion of the first set of multiple periodic occasions based on the configuration and the second message

1515

Transmit, to the network entity and based on the second message, a report including the one or more cross-link interference measurements during a periodic occasion of the second set of multiple periodic occasions, where the one or more cross-link interference measurements is based on monitoring the resource

1520

Receive, from the network entity, a third message deactivating the configuration for measuring cross-link interference during the first set of multiple periodic occasions and for reporting the one or more cross-link interference measurements during the second set of multiple periodic occasions

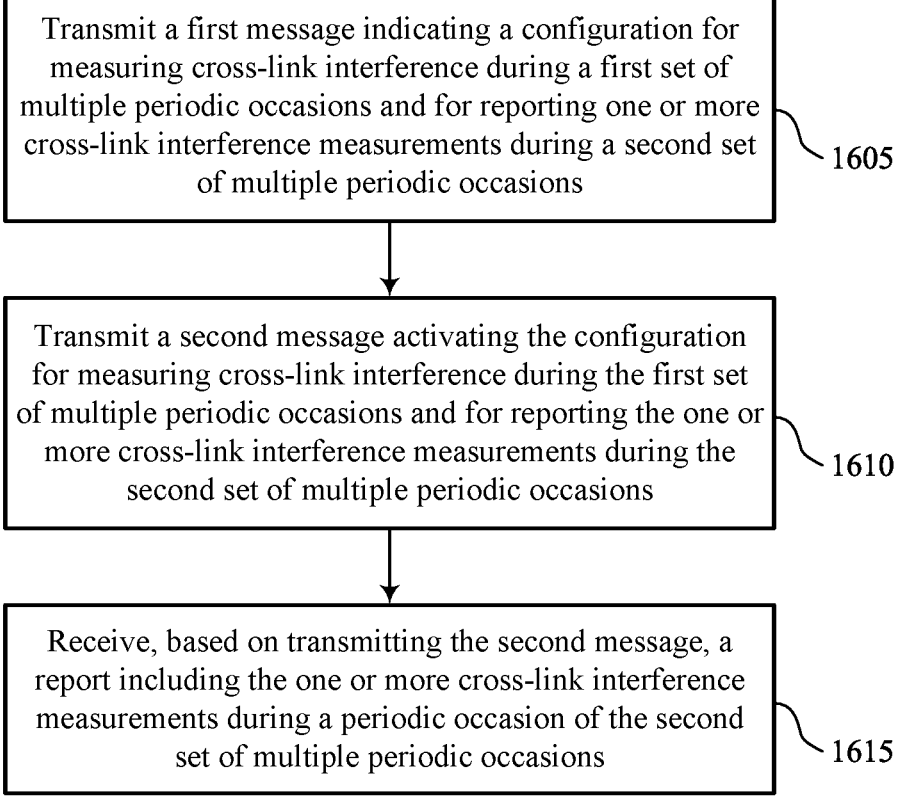

Transmit a first message indicating a configuration for measuring cross-link interference during a first set of multiple periodic occasions and for reporting one or more cross-link interference measurements during a second set of multiple periodic occasions

1605

Transmit a second message activating the configuration for measuring cross-link interference during the first set of multiple periodic occasions and for reporting the one or more cross-link interference measurements during the second set of multiple periodic occasions

1610

Receive, based on transmitting the second message, a report including the one or more cross-link interference measurements during a periodic occasion of the second set of multiple periodic occasions

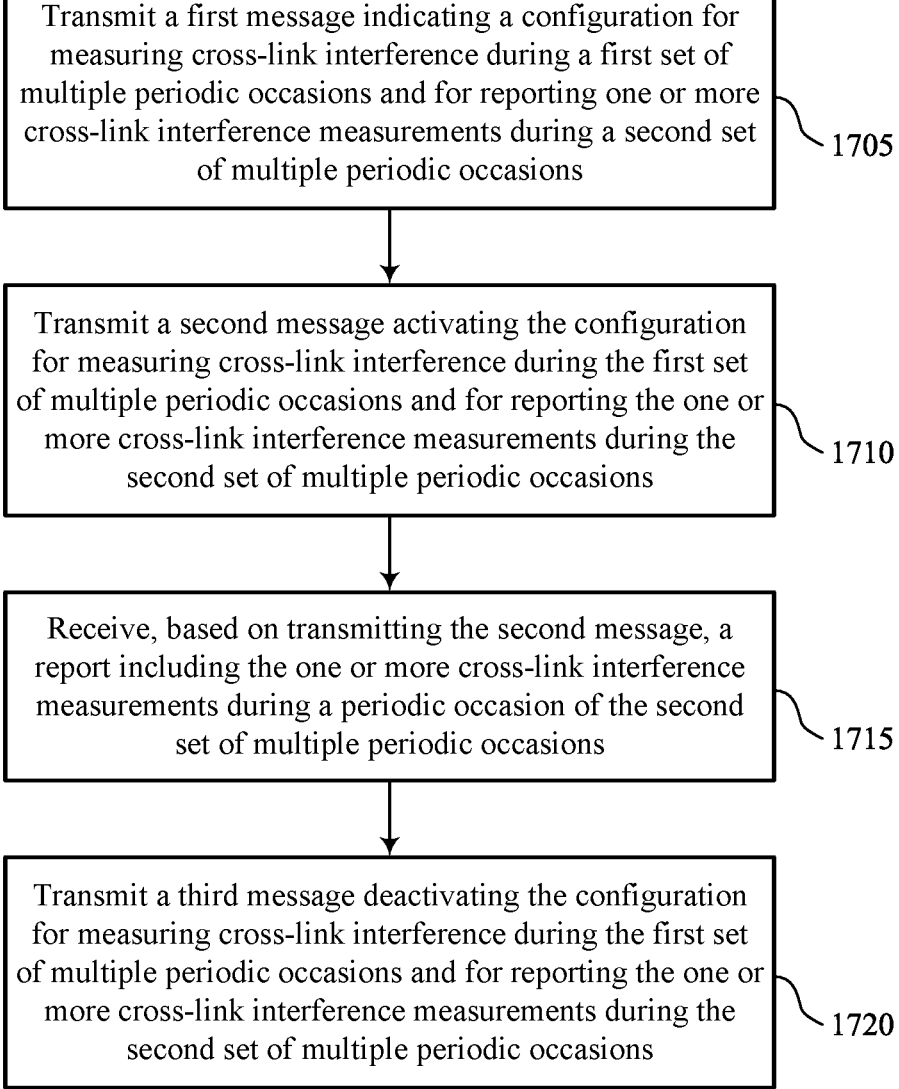

Transmit a first message indicating a configuration for measuring cross-link interference during a first set of multiple periodic occasions and for reporting one or more cross-link interference measurements during a second set of multiple periodic occasions

1705

Transmit a second message activating the configuration for measuring cross-link interference during the first set of multiple periodic occasions and for reporting the one or more cross-link interference measurements during the second set of multiple periodic occasions

1710

Receive, based on transmitting the second message, a report including the one or more cross-link interference measurements during a periodic occasion of the second set of multiple periodic occasions

1715

Transmit a third message deactivating the configuration for measuring cross-link interference during the first set of multiple periodic occasions and for reporting the one or more cross-link interference measurements during the second set of multiple periodic occasions

JOINT ACTIVATION OF CROSS-LINK INTERFERENCE MEASUREMENT AND REPORTING

FIELD OF TECHNOLOGY

The present disclosure relates to wireless communications, including joint activation of cross-link interference (CLI) measurement and reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, one or more devices of a wireless communications system may operate according to a full-duplex mode of operation. As a result of operating according to the full-duplex mode, a device of the wireless communications system (e.g., a UE) may experience cross-link interference (CLI). In an attempt to mitigate or reduce the effects of the CLI, the device may report CLI measurements to a network entity of the wireless communications system.

SUMMARY

The described techniques relate to improved methods, systems, devices, and apparatuses that support joint activation of cross-link interference (CLI) measurement and reporting. For example, the described techniques provide for a user equipment (UE) to measure CLI and provide CLI measurements to a network entity. In some examples, a UE may receive a configuration for semi-persistent CLI measurement and CLI measurement reporting. Further, the UE may receive an activation message activating the configuration. Upon receiving the activation message, the UE may monitor a resource during a periodic occasion associated with CLI measurement and determine one or more CLI measurements. Additionally, the UE may transmit a report indicating the one or more CLI measurements to the network entity during a periodic occasion associated with CLI measurement reporting. The techniques as described herein provide a signaling schemes for CLI measurement reporting such that devices of a wireless communications system may mitigate or reduce the effects of CLI.

A method for wireless communication at a UE is described. The method may include receiving, from a network entity, a first message indicating a configuration for measuring CLI during a first set of multiple periodic occasions and for reporting one or more CLI measurements during a second set of multiple periodic occasions, receiving, from the network entity, a second message activating the configuration for measuring CLI during the first set of multiple periodic occasions and for reporting the one or more CLI measurements during the second set of multiple periodic occasions, monitoring a resource during a periodic occasion of the first set of multiple periodic occasions based on the configuration and the second message, and transmitting, to the network entity and based on the second message, a report including the one or more CLI measurements during a periodic occasion of the second set of multiple periodic occasions, where the one or more CLI measurements is based on monitoring the resource.

An apparatus for wireless communication at a UE is described. The apparatus may include a processor, memory coupled with the processor, and instructions stored in the memory. The instructions may be executable by the processor to cause the apparatus to receive, from a network entity, a first message indicating a configuration for measuring CLI during a first set of multiple periodic occasions and for reporting one or more CLI measurements during a second set of multiple periodic occasions, receive, from the network entity, a second message activating the configuration for measuring CLI during the first set of multiple periodic occasions and for reporting the one or more CLI measurements during the second set of multiple periodic occasions, monitor a resource during a periodic occasion of the first set of multiple periodic occasions based on the configuration and the second message, and transmit, to the network entity and based on the second message, a report including the one or more CLI measurements during a periodic occasion of the second set of multiple periodic occasions, where the one or more CLI measurements is based on monitoring the resource.

Another apparatus for wireless communication at a UE is described. The apparatus may include means for receiving, from a network entity, a first message indicating a configuration for measuring CLI during a first set of multiple periodic occasions and for reporting one or more CLI measurements during a second set of multiple periodic occasions, means for receiving, from the network entity, a second message activating the configuration for measuring CLI during the first set of multiple periodic occasions and for reporting the one or more CLI measurements during the second set of multiple periodic occasions, means for monitoring a resource during a periodic occasion of the first set of multiple periodic occasions based on the configuration and the second message, and means for transmitting, to the network entity and based on the second message, a report including the one or more CLI measurements during a periodic occasion of the second set of multiple periodic occasions, where the one or more CLI measurements is based on monitoring the resource.

A non-transitory computer-readable medium storing code for wireless communication at a UE is described. The code may include instructions executable by a processor to receive, from a network entity, a first message indicating a configuration for measuring CLI during a first set of multiple periodic occasions and for reporting one or more CLI measurements during a second set of multiple periodic occasions, receive, from the network entity, a second message activating the configuration for measuring CLI during the first set of multiple periodic occasions and for reporting the one or more CLI measurements during the second set of multiple periodic occasions, monitor a resource during a periodic occasion of the first set of multiple periodic occasions based on the configuration and the second message, and transmit, to the network entity and based on the second message, a report including the one or more CLI measurements during a periodic occasion of the second set of multiple periodic occasions, where the one or more CLI measurements is based on monitoring the resource.

Some examples of the method, apparatuses, and non-transitory computer-readable medium described herein may further include operations, features, means, or instructions for receiving, from the network entity, a third message deactivating the configuration for measuring CLI during the first set of multiple periodic occasions and for reporting the one or more CLI measurements during the second set of multiple periodic occasions.

In some examples of the method, apparatuses, and non-transitory computer-readable medium described herein, monitoring the resource during the periodic occasion of the first set of multiple periodic occasions may include operations, features, means, or instructions for monitoring the resource after a first duration from a slot where the second message may be received.

In some examples of the method, apparatuses, and non-transitory computer-readable medium described herein, transmitting the report during the periodic occasion of the second set of multiple periodic occasions may include operations, features, means, or instructions for transmitting the report after the first duration or a second duration from the slot where the second message may be received, where the first duration may be different from the second duration.

In some examples of the method, apparatuses, and non-transitory computer-readable medium described herein, the first message further includes a second configuration for measuring CLI during a third set of multiple periodic occasions and for reporting one or more second CLI measurements during a fourth set of multiple periodic occasion.

Some examples of the method, apparatuses, and non-transitory computer-readable medium described herein may further include operations, features, means, or instructions for monitoring a second resource during a periodic occasion of the third set of multiple periodic occasions based on the second message activating the second configuration.

Some examples of the method, apparatuses, and non-transitory computer-readable medium described herein may further include operations, features, means, or instructions for monitoring the resource during a periodic occasion of the third set of multiple periodic occasions based on the second message activating the second configuration.

In some examples of the method, apparatuses, and non-transitory computer-readable medium described herein, the first message includes a medium access control control element (MAC-CE), the MAC-CE including a set of bit fields.

In some examples of the method, apparatuses, and non-transitory computer-readable medium described herein, a first subset of the set of bit fields corresponds to the configuration and monitoring the resource may be based on a logic value of each respective bit field of the first subset.

In some examples of the method, apparatuses, and non-transitory computer-readable medium described herein, a second subset of the set of bit fields corresponds to a channel state information (CSI) report configuration.

In some examples of the method, apparatuses, and non-transitory computer-readable medium described herein, transmitting the report during the periodic occasion of the second set of multiple periodic occasions may include operations, features, means, or instructions for transmitting a CSI report, the CSI report including channel state feedback (CSF) based on the one or more CLI measurements.

In some examples of the method, apparatuses, and non-transitory computer-readable medium described herein, the configuration includes an indication of a first periodicity associated with the first set of multiple periodic occasions, a second periodicity associated with the second set of multiple periodic occasions, one or more resources to be monitored during the first set of multiple periodic occasions, a type of the one or more CLI measurements to include in the report, a priority associated with the configuration, or a combination thereof.

A method for wireless communication at a network entity is described. The method may include transmitting a first message indicating a configuration for measuring CLI during a first set of multiple periodic occasions and for reporting one or more CLI measurements during a second set of multiple periodic occasions, transmitting a second message activating the configuration for measuring CLI during the first set of multiple periodic occasions and for reporting the one or more CLI measurements during the second set of multiple periodic occasions, and receiving, based on transmitting the second message, a report including the one or more CLI measurements during a periodic occasion of the second set of multiple periodic occasions.

An apparatus for wireless communication at a network entity is described. The apparatus may include a processor, memory coupled with the processor, and instructions stored in the memory. The instructions may be executable by the processor to cause the apparatus to transmit a first message indicating a configuration for measuring CLI during a first set of multiple periodic occasions and for reporting one or more CLI measurements during a second set of multiple periodic occasions, transmit a second message activating the configuration for measuring CLI during the first set of multiple periodic occasions and for reporting the one or more CLI measurements during the second set of multiple periodic occasions, and receive, based on transmitting the second message, a report including the one or more CLI measurements during a periodic occasion of the second set of multiple periodic occasions.

Another apparatus for wireless communication at a network entity is described. The apparatus may include means for transmitting a first message indicating a configuration for measuring CLI during a first set of multiple periodic occasions and for reporting one or more CLI measurements during a second set of multiple periodic occasions, means for transmitting a second message activating the configuration for measuring CLI during the first set of multiple periodic occasions and for reporting the one or more CLI measurements during the second set of multiple periodic occasions, and means for receiving, based on transmitting the second message, a report including the one or more CLI measurements during a periodic occasion of the second set of multiple periodic occasions.

A non-transitory computer-readable medium storing code for wireless communication at a network entity is described. The code may include instructions executable by a processor to transmit a first message indicating a configuration for measuring CLI during a first set of multiple periodic occasions and for reporting one or more CLI measurements during a second set of multiple periodic occasions, transmit a second message activating the configuration for measuring CLI during the first set of multiple periodic occasions and for reporting the one or more CLI measurements during the second set of multiple periodic occasions, and receive, based on transmitting the second message, a report including the one or more CLI measurements during a periodic occasion of the second set of multiple periodic occasions.

Some examples of the method, apparatuses, and non-transitory computer-readable medium described herein may further include operations, features, means, or instructions for transmitting a third message deactivating the configuration for measuring CLI during the first set of multiple periodic occasions and for reporting the one or more CLI measurements during the second set of multiple periodic occasions.

In some examples of the method, apparatuses, and non-transitory computer-readable medium described herein, the first message includes a MAC-CE, the MAC-CE including a set of bit fields.

In some examples of the method, apparatuses, and non-transitory computer-readable medium described herein, a first subset of the set of bit fields corresponds to the configuration.

In some examples of the method, apparatuses, and non-transitory computer-readable medium described herein, a second subset of the set of bit fields corresponds to a CSI report configuration.

In some examples of the method, apparatuses, and non-transitory computer-readable medium described herein, receiving the report during the periodic occasion of the second set of multiple periodic occasions may include operations, features, means, or instructions for receiving a CSI report, the CSI report including CSF based on the one or more CLI measurements.

In some examples of the method, apparatuses, and non-transitory computer-readable medium described herein, the configuration includes an indication of a first periodicity associated with the first set of multiple periodic occasions, a second periodicity associated with the second set of multiple periodic occasions, one or more resources to be monitored during the first set of multiple periodic occasions, a type of the one or more CLI measurements to include in the report, a priority associated with the configuration, or a combination thereof.

6

Figure 10:
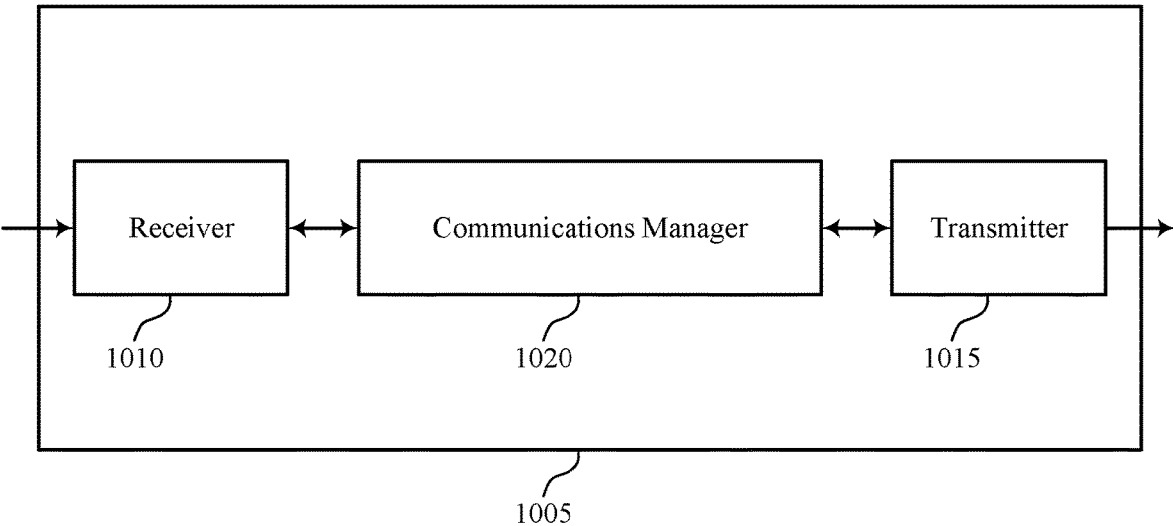
Figure 11:
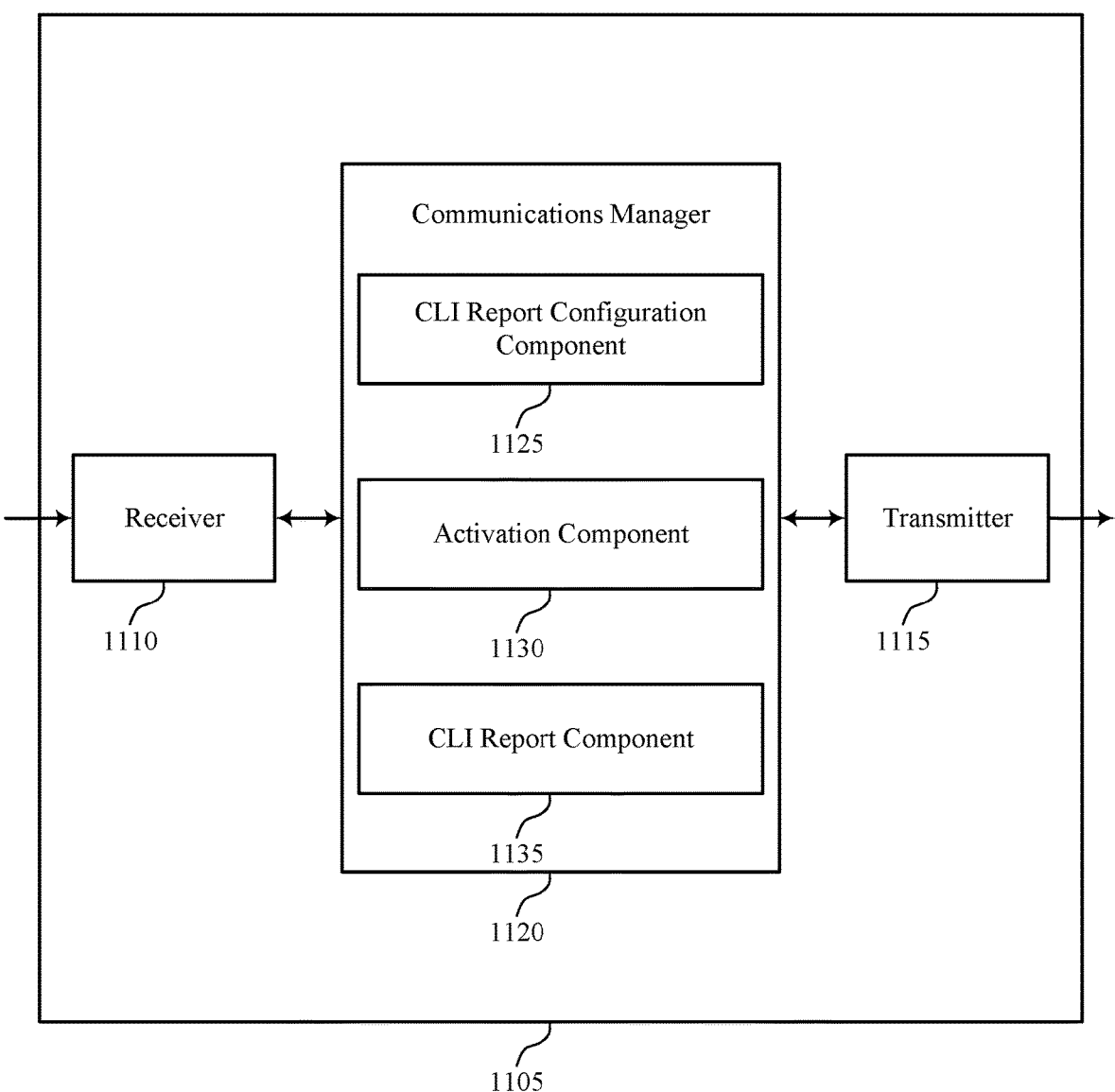

FIGS. 10 and 11 illustrate block diagrams of devices that support joint activation of CLI measurement and reporting in accordance with one or more aspects of the present disclosure.

Figure 12:
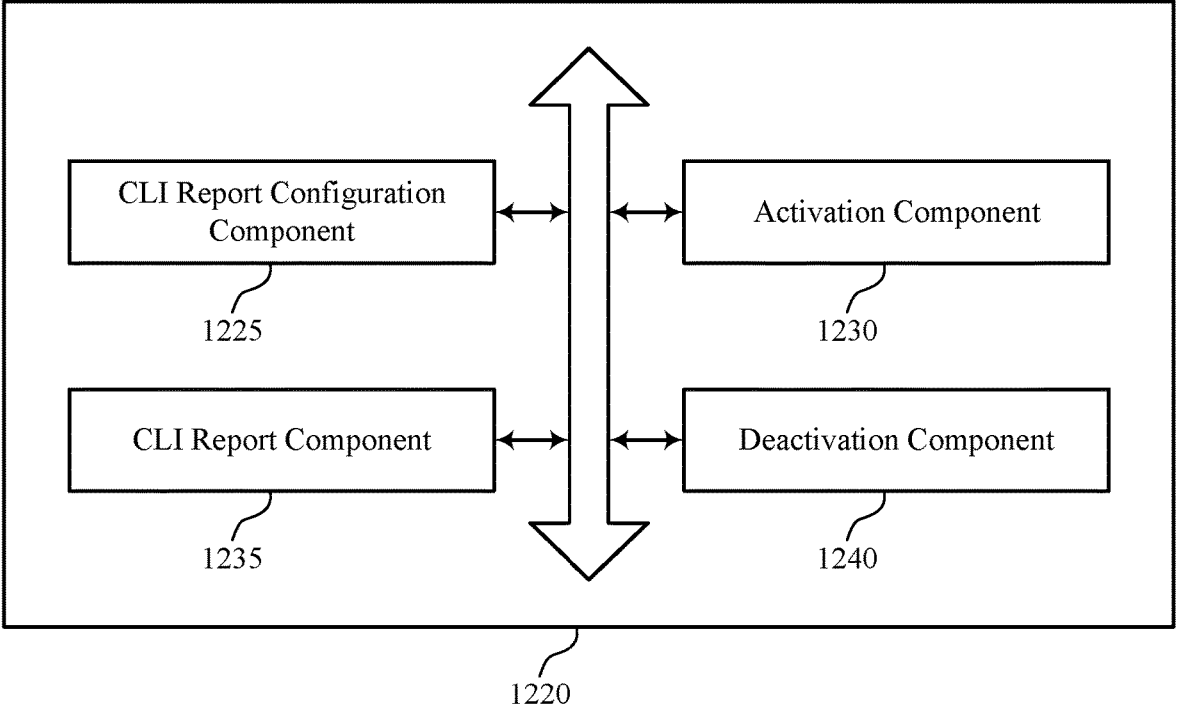

FIG. 12 illustrates a block diagram of a communications manager that supports joint activation of CLI measurement and reporting in accordance with one or more aspects of the present disclosure.

Figure 13:

FIG. 13 illustrates a diagram of a system including a device that supports joint activation of CLI measurement and reporting in accordance with one or more aspects of the present disclosure.

FIGS. 14 through 17 illustrate flowcharts showing methods that support joint activation of CLI measurement and reporting in accordance with one or more aspects of the present disclosure.

DETAILED DESCRIPTION

In some examples, a wireless communications system may support a full-duplex mode of operation. In a full-duplex mode of operation, a device transmits and receives signals using a same set of resources as opposed to half duplex where a device transmits and receives signals using a different set of resources. Operating according to full-duplex mode of operation may cause interference at one or more devices in the wireless communications system. For example, a network entity may be configured to operate according to full duplex and a user equipment (UE) may be configured to operate according to half-duplex. In such a scenario, the UE may encounter inter-cell interference from other network entities, intra-cell cross-link interference (CLI) from other UEs in the same cell, and intra-cell CLI from other UEs in adjacent cells. Currently, to mitigate the effects of CLI, the UE transmits a report indicating CLI measurements to the network entity. However, an efficient signaling scheme from a network entity to activate the measuring and reporting of CLI measurements by the UE has yet to be realized.

In some examples, a UE receives signaling that indicates a CLI report configuration to measure CLI and report CLI to a network entity. The CLI report configuration may include a first set of resources to monitor for measurement of CLI and a second set of resources for reporting CLI measurements. Further, the UE may support semi-persistent reporting of CLI measurements. In such cases, the CLI report configuration may also include a first periodicity associated with measuring CSI as well as a second periodicity associated with CSI measurement reporting. Upon receiving signaling to activate the CLI report configuration, the UE monitors the first set of resources during a periodic occasion according to the first periodicity and determines CLI measurements and transmits a report that includes the CLI measurements to the network entity using the second set of resources during a periodic occasion according to the second periodicity. In some examples, the activation message may be an example of a medium access control control element (MAC-CE) and the UE may determine to activate the CLI report configuration based on a logic value of a bit field included in the MAC-CE corresponding to the CLI report configuration. Further, in some examples, the UE may receive multiple CLI report configurations. The multiple CLI report configurations may correspond to different measurement resources (e.g., set of resource used to measurement CLI) or may correspond to the same monitoring resources. Using the above techniques, the UE may efficiently report CLI measurements to the network entity.

Aspects of the disclosure are initially described in the context of wireless communications systems. Additional aspects of the disclosure are describes in the context of message formats and a process flow. Aspects of the disclosure are further illustrated by and described with reference to apparatus diagrams, system diagrams, and flowcharts that relate to joint activation of CLI measurement and reporting.

Figure 1:
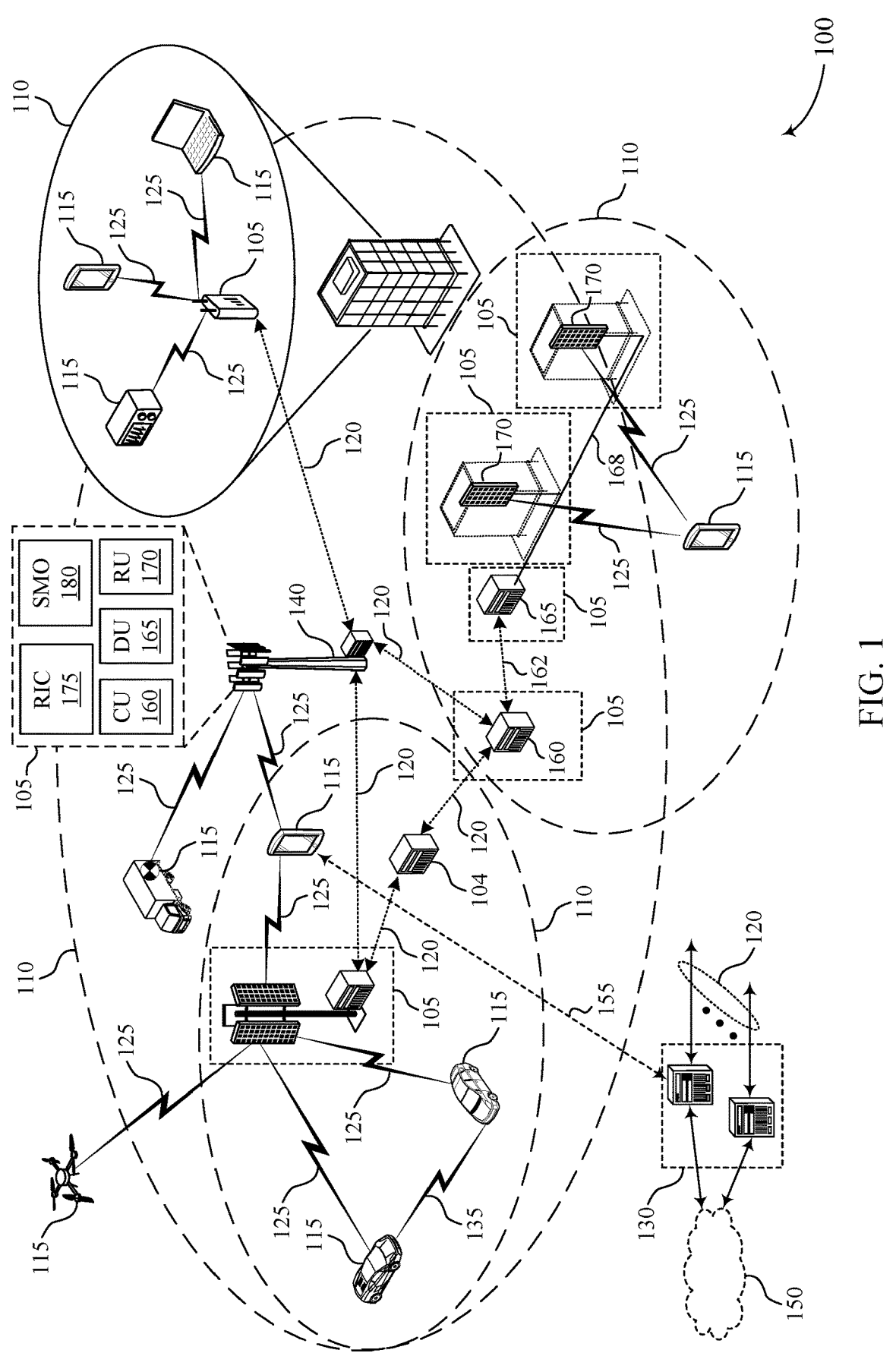
FIGS. 1 and 2 illustrate examples of a wireless communications system that supports joint activation of cross-link interference (CLI) measurement and reporting in accordance with one or more aspects of the present disclosure.

FIG. 1 illustrates an example of a wireless communications system 100 that supports joint activation of CLI measurement and reporting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support joint activation of CLI measurement and reporting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $TS=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

As describes herein, a UE 115 may measure CLI and provide CLI measurements to a network entity. In some examples, a UE 115 may receive a configuration for semi-persistent CLI measurement and CLI measurement reporting from the network entity 105. Further, the UE 115 may receive an activation message activating the configuration from the network entity 105. Upon receiving the activation message, the UE 115 may monitor a resource during a periodic occasion associated with CLI measurement and determine one or more CLI measurements. Additionally, the UE 115 may transmit a report indicating the one or more CLI measurements to the network entity during a periodic occasion associated with CLI measurement reporting. The techniques as described herein provide a signaling schemes for CLI measurement reporting such that devices of a wireless communications system may mitigate or reduce the effects of CLI.

Figure 2:
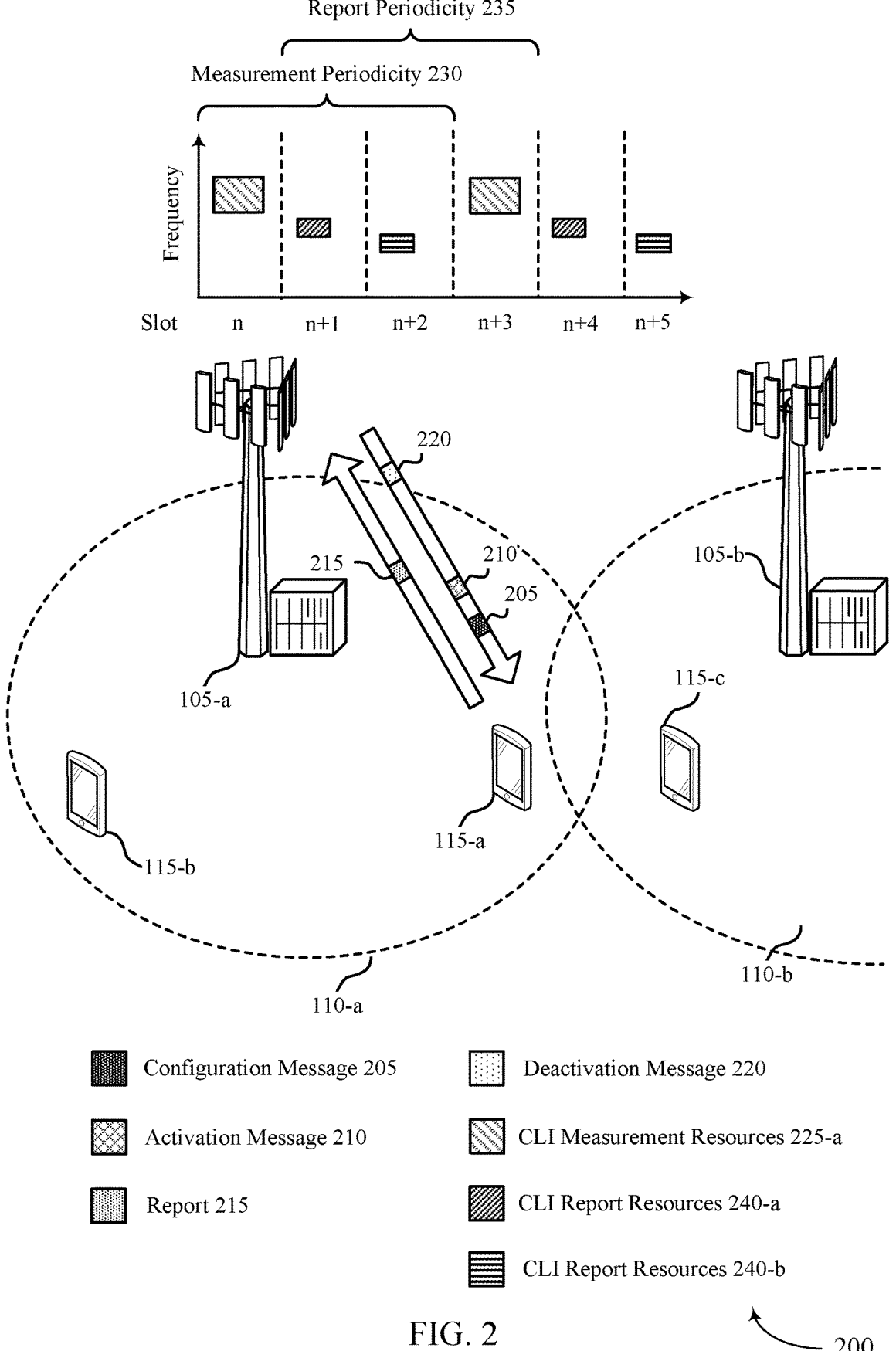

FIG. 2 illustrates an example of a wireless communications system 200 that supports joint activation of CLI measurement and reporting in accordance with one or more aspects of the present disclosure. In some examples, the wireless communications system 200 may implement aspects of a wireless communications system 100. For example, the wireless communications system 200 may include a UE 115-*a*, a UE 115-*b*, and a UE 115-*c* which may be examples of UEs 115 as described with reference to FIG. 1. Further, the wireless communications system 200 may include a network entity 105-*a* and a network entity 105-*b* which may be an example of network entities 105 as described with reference with FIG. 1.

In some examples, devices of the wireless communications system 200 (e.g., the UEs 115 or the network entities 105) may operate according to different duplexing modes. In one example, a device may operate according to a half-duplex mode. In a half-duplex mode, the device may transmit signaling to another device using a first set of resources (e.g., a first set of time resource or a first set of frequency resources) and receive signaling from another device using a second set of resources (e.g., a second set of time resource or a second of frequency resources) different from the first set of resources. In a full-duplex mode, the device may transmit signaling to or receive signaling from another device using a same set of resources. In some examples, there may be two different types of full-duplex operation. A first type of full-duplex operation may be known as in-band full duplex (IBFD) and a second type of full-duplex operation may be known as sub-band frequency division duplexing (FDD). In a IBFD mode, time and frequency resources allocated for uplink signaling may partially overlap or fully overlap with time and frequency resources allocated for downlink signaling. In a sub-band FDD mode, time resources allocated for uplink signaling may fully overlap the with time resources allocated for downlink signaling, but frequency resources allocated for uplink signaling may be separated from frequency resources allocated for downlink signaling by a guard band.

In some examples, operating according to different duplexing modes may cause interference at one or more devices of the wireless communications system 200. As shown in FIG. 2, the UE 115-*a* and the UE 115-*b* may be located within a coverage area 110-*a* of a network entity 105-*a* and therefore, may establish communications with the network entity 105-*a*. Further, the UE 115-*c* may be located within a coverage area 110-*b* of a network entity 105-*b* and therefore, may establish communication with the network entity 105-*b*. In one example, the UE 115-*a* may operate according to a half-duplex mode and the network entity 105-*a* may operate according to a full-duplex mode. In such example, the UE 115-*a* may experience interference. One source of interference may be from UEs 115 located within the coverage area 110-*a* (e.g., intra-cell CLI). For example, the UE 115-*b* may transmit uplink signaling to the network entity 105-*a* using the same resources that the UE 115-*a* uses to receive downlink signaling from the network entity 105-*a*. Another source of interference may be from neighboring UEs 115 (e.g., inter-cell CLI). For example, the UE 115-*c* may transmit uplink signaling to the network entity 105-*b* using the same resource that the UE 115-*a* uses to receive downlink signaling from the network entity 105-*a*. In some examples, in an effort to mitigate or account for CLI, the UE 115-*a* may report CLI measurements to the network entity 105-*a*. However, a signaling scheme for reporting CLI measurements to the network entity 105-*a* has yet to be realized.

As described herein, a UE 115-*a* may measure CLI and report CLI measurements to the network entity 105-*a* on semi-persistent basis. In some examples, a UE 115-*a* may receive a configuration message 205 from the network entity 105-*a*. The configuration message 205 may include information related to measuring CLI as well as information related to reporting CLI measurement. For example, the configuration message 205 may include one or more CLI report configurations. Each CLI report configuration may include one or more of a periodicity associated with reporting CLI, a periodicity associated with measuring CLI, a set of resources for reporting CLI, a set of resources for measuring CLI (e.g., ZP-sound reference signal (SRS) resources), a type of CLI measurement to include in the report (e.g., CLI-reference signal received power (RSRP) or CLI-received signal strength indicator (RSSI)), an activation timing for reporting CLI, a deactivation timing for reporting CLI, an activation timing for measuring CLI, a deactivation timing for measuring CLI, or priority information associated with the CLI report.

After receiving the configuration message 205, the UE 115-*a* may receive an activation message 210. In some examples, the activation message 210 may be included in a MAC-CE. Further, the activation message 210 may activate one or more of the CLI report configurations included in the configuration message 205. That is, a singular activation message 210 (e.g., a single MAC-CE) may activate semi-persistent CLI measurement and CLI reporting at the UE 115-*a*. As one example, the activation message 210 may activate a first CLI report configuration. In some examples, the first CLI report configuration may correspond to a measurement periodicity 230, a report periodicity 235, CLI measurement resources 225-*a*, and CLI report resources 240-*a*. As illustrated in FIG. 2, the measurement periodicity 230 may be equal to three slots and the report periodicity 235 may be equal to three slots. Upon receiving the activation message 210, the UE 115-*a* may perform joint CLI measurement and CLI reporting according to the first CLI report configuration. For example, at slot n, the UE 115-*a* may measure CLI using the CLI measurement resources 225-*a* and at slot n+1, the UE 115-*a* may transmit a report 215 including the CLI measurements (e.g., the CLI measured at slot n) using the CLI report resources 240-*a*. Further, at slot n+3, the UE 115-*a* may measure CLI using the CLI measurement resources 225-*a* and at slot n+4, the UE 115-*a* may transmit a report 215 including the CLI measurements (e.g., the CLI measured at slot n+3) using the CLI report resources 240-*a*.

In some examples, the UE 115-*a* may determine a first slot to start measuring CLI (e.g., slot n) based on the activation timing for measuring CLI included in the configuration message 205. Similarly, the UE 115-*a* may determine a first slot to start reporting CLI (e.g., slot n+1) based on the activation timing for reporting CLI included in the configuration message 205. In some examples, the activation timing for measuring CLI and the activation timing for reporting CLI may indicate a number of slots between a slot corresponding to PDSCH signaling carrying the activation message 210 and a slot that the UE 115-*a* is to start measuring CLI or reporting CLI. In some examples, the activation timing for measuring CLI and the activation timing for reporting CLI may be the same. For example, the activation timing for measuring CLI and the activation timing for reporting CLI may be a first slot that is after slot $$i + 3N_{slot}^{subframe,\mu},$$

where i is the slot corresponding to PDSCH signaling carrying the activation message 210 and μ is the subcarrier spacing (SCS) configuration for a physical uplink control channel (PUCCH). Alternatively, the activation timing for measuring CLI and the activation timing for reporting CLI may be the different. In such example, the activation timing for measuring CLI may be a first slot that is after slot $$i + 3N_{slot}^{subframe,\mu}$$

and the activation timing for reporting CLI may be a first slot that is after slot $$i + 4N_{slot}^{subframe,\mu}.$$

In some examples, the UE 115-*a* may continue to measure and report CLI according to the first configuration until reception of a deactivation message 220. The deactivation message 220 may deactivate one or more active report configurations (e.g., the first report configuration or any other report configuration activated via the activation message 210 or a different activation message). In some examples, deactivation of the first report configuration may not occur immediately after receiving the deactivation message 220. Instead, the UE 115-*a* may wait to deactivate measurement and reporting of CLI based on the deactivation timing for measuring CLI and the deactivation time for reporting CLI. That is, the UE 115-*a* may determine a last candidate slot to measure CLI based on the deactivation timing for measuring CLI included in the configuration message 205.

Similarly, the UE 115-*a* may determine a last candidate slot to report CLI based on the deactivation timing for reporting CLI included in the configuration message 205. In some examples, the deactivation timing for measuring CLI and the deactivation timing for reporting CLI indicate a number of slots between a slot corresponding to PDSCH signaling carrying the deactivation message 220 and a slot that the UE 115-*a* is to stop measuring CLI or reporting CLI. In some examples, the deactivation timing for measuring CLI and the deactivation timing for reporting CLI may be the same. For example, the deactivation timing for measuring CLI and the deactivation timing for reporting CLI may be the first slot that is after slot $$j + 3N_{slot}^{subframe,\mu},$$

where j is the slot corresponding to PDSCH signaling carrying the deactivation message 220 and μ is the SCS configuration for PUCCH. Alternatively, the deactivation timing for measuring CLI and the deactivation timing for reporting CLI may be the different. In such example, the deactivation timing for measuring CLI may be the first slot that is after slot $$j + 3N_{slot}^{subframe,\mu}$$

and the deactivation timing for reporting CLI may be the first slot that is after slot $$j + 4N_{slot}^{subframe}.$$

In some examples, the UE 115-*a* may be configured with multiple CLI report configurations. For example, the UE 115-*a* may be configured with the first CLI report configuration and a second CLI report configuration. In such example, each CLI report configuration may correspond to different CLI measurement resources 225. For example, the first CLI report configuration may correspond to the CLI measurement resources 225-*a* and the second CLI report configuration may correspond to CLI measurement resources different from the CLI measurement resources 225-*a*. For example, the CLI measurement resources 225-*a* may include time or frequency resources that are different from the CLI measurement resources corresponding to the second CLI report configuration. In such example, the CLI measurement resources 225 are considered active when the corresponding CLI report configuration is active and CLI measurement resources 225 are considered deactivated when the corresponding CLI report configuration is deactivated.

Alternatively, two or more CLI report configurations of the multiple CLI report configuration may share CLI measurement resources 225 (e.g., share same frequency resources). For example, both the first CLI report configuration and the second CLI report configuration may correspond to the CLI measurement resources 225-a. That is, a CLI report configuration may correspond to a one set of CLI measurement resources 225 and in some examples, the CLI report configuration may not correspond to more than one CLI measurement resources 225. In some examples, the first CLI report configuration and the second CLI report configuration may share the CLI measurement resources 225-a, but the first CLI report configuration and the second CLI report configuration may correspond to different measurement periodicities 230 that do not overlap or may correspond to different measurement periodicities 230 that overlap. In such example, the CLI measurement resources 225-a are activated when one of the first CLI report configuration or the second CLI report is activated and the CLI measurement resources 225-a are deactivated when both the first CLI report and the second CLI report are deactivated. Further, the second CLI report configuration may correspond to CLI report resources 240-b and the UE 115-a may transmit a report (e.g., different from the report 215) including CLI measurements using the CLI report resources 240-b.

The techniques as described herein may provide an efficient signaling scheme for reporting CLI. Further, the use of one activation message 210 for joint activation and deactivation of semi-persistent CLI reporting and CLI measurement as described herein may reduce signaling (e.g., control overhead) when compared to using two separate activation messages 210 (e.g., one for CLI measurement and one for CLI reporting).

Figure 3:
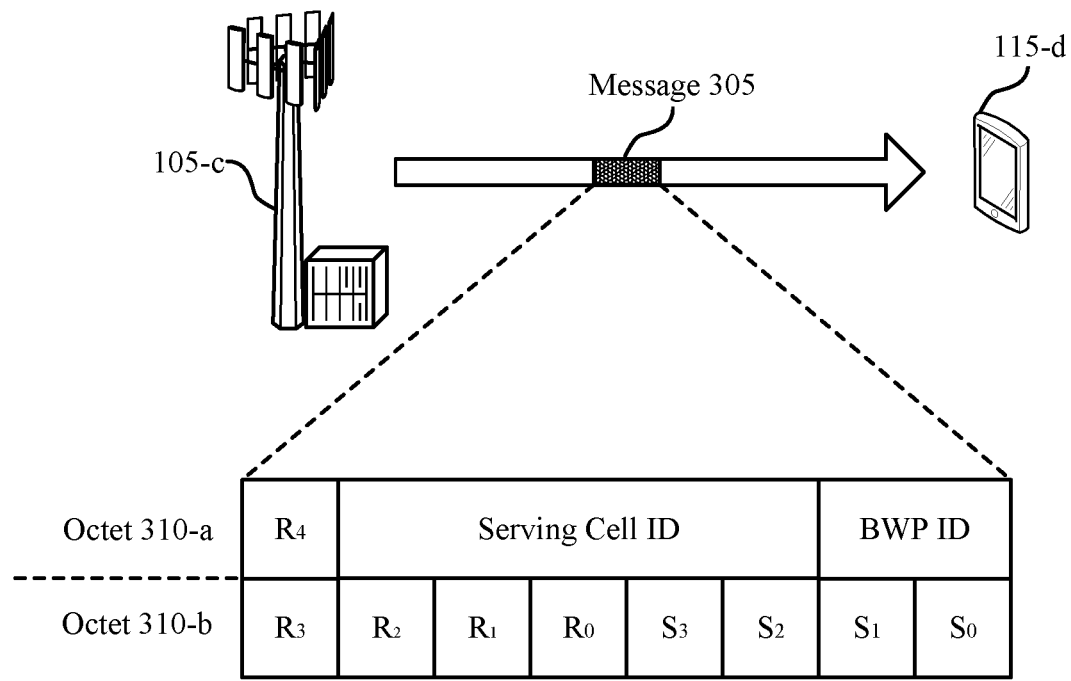
FIGS. 3 and 4 illustrate examples of a message format that supports joint activation of CLI measurement and reporting in accordance with one or more aspects of the present disclosure.

FIG. 3 illustrates an example of a message format 300 that supports joint activation of CLI measurement and reporting in accordance with one or more aspects of the present disclosure. In some examples, the message format 300 may be implemented by a UE 115-d and a network entity 105-c which may be examples of a UE 115 and a network entity 105 as described with respect to a wireless communications system 100 and a wireless communications system 200.

As described with reference to FIG. 2, a UE 115-d may receive a message 305 from a network entity 105-c that indicates an activation status (e.g., activation message) or a deactivation status (deactivation message) of one or more semi-persistent CLI report configurations. In some examples, the message 305 may be carried in a MAC-CE. Further, the MAC-CE carrying the message 305 may be a MAC-CE indicating an activation status or a deactivation status of one or more CSI report configurations within a list of CSI report configurations (e.g., csi-ReportConfigToAddModList).

In such example, the MAC-CE may include two octets 310. For example, as shown in FIG. 3, the MAC-CE may include an octet 310-a and an octet 310-b. An octet 310 may be described as a unit of digital information that includes eight bits. The octet 310-a of the MAC-CE may include three bit fields, a reserved bit field (e.g., $R_4$), a serving cell identifier (ID) bit field, and a BWP ID bit field. Alternatively, the octet 310-b may include eight bit fields, four reserved bitfields e.g., ($R_0$, $R_1$, $R_2$, and $R_3$) and four channel state information (CSI) report configuration bit fields (e.g., $S_0$. $S_1$, $S_2$, and $S_3$). $S_0$ may refer to a CSI report configuration which includes PUCCH resources for semi-persistent CSI reporting in the indicated BWP (e.g., indicated via the BWP ID bit field) and has the lowest CSI report configuration ID (e.g., CSI-ReportConfigId) within the list of CSI report configurations (e.g., csi-ReportConfigToAddModList). $S_1$ may have the second lowest CSI report configuration ID, $S_2$ may have the third lowest CSI report configuration ID, and $S_3$ may have third lowest CSI report configuration ID. If the number CSI report configurations is less than i+1, the MAC entity may ignore the $S_i$ field. Further, an $S_i$ field including a bit with a logic value of one may indicate an activation status for the corresponding CSI report configuration, whereas an $S_i$ field including a bit with a logic value of zero may indicate a deactivation status the corresponding CSI report configuration.

In some examples, one or more of the reserved bits fields (e.g., $R_0$, $R_1$, $R_2$, $R_3$, and $R_3$) may be used to indicate activation statuses or a deactivation statuses of CLI report configurations. As one example, the UE 115-d may be configured with a first CLI report configuration and a second CLI report configuration. In such example, $R_1$ may refer to the first CLI report configuration. Further, $R_2$ may refer to the second report configuration. If the $R_1$ field includes a bit with a logic value of one, the status of the first CLI report configuration may be active and if the $R_1$ field includes a bit with a logic value of zero, the status of the first CLI report configuration may be deactivated. Similarly, if the $R_2$ field includes a bit with a logic value of one, the status of the second CLI report configuration may be active and if the $R_2$ field includes a bit with a logic value of zero, the status of the second CLI report configuration may be deactivated.

Figure 4:
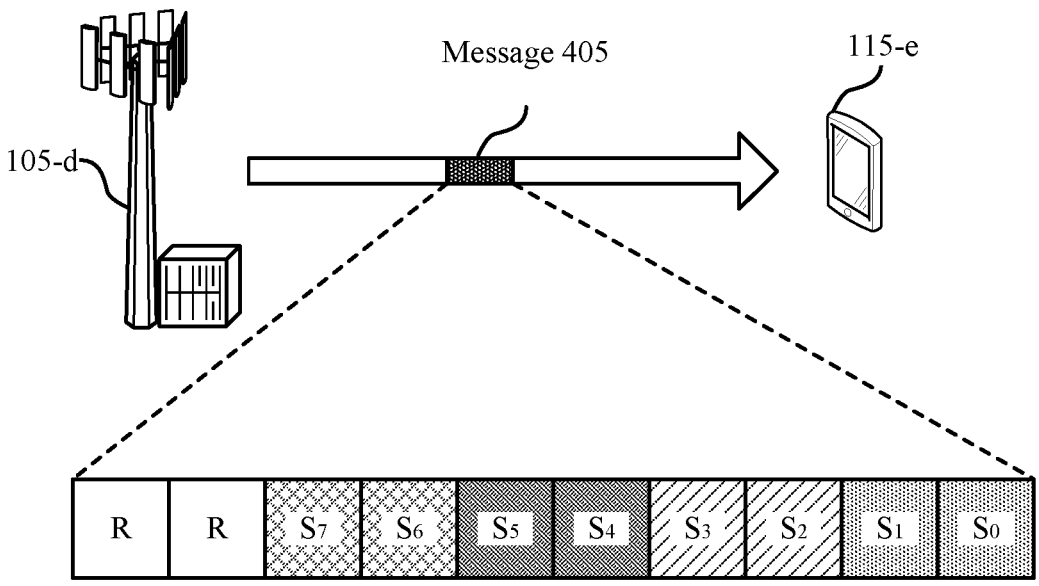

FIG. 4 illustrates an example of a message format 400 that supports joint activation of CLI measurement and reporting in accordance with one or more aspects of the present disclosure. In some examples, the message format 400 may be implemented by a UE 115-e and a network entity 105-d which may be examples of a UE 115 and a network entity 105 as described with respect to a wireless communications system 100, a wireless communications system 200, and a message format 300.

A described in FIG. 2, a UE 115-e may receive a message 405 from a network entity 105-d that indicates an activation status (e.g., activation message) or a deactivation status (e.g., deactivation message) of one or more semi-persistent CLI report configurations. In some examples, the message 405 may be carried in a MAC-CE that includes a set of bit fields. For example, as illustrated in FIG. 4, the MAC-CE may include ten bit fields: two reserved bit fields and four CLI report configuration bit fields (e.g., $S_0$ and $S_1$, $S_2$ and $S_3$, $S_4$ and $S_5$, and $S_6$ and $S_7$). In some examples, as described with reference to FIG. 2, the UE 115-e may be configured with multiple CLI report configurations. For example, the UE 115-e may be configured with a CLI report configuration 415-a, a CLI report configuration 415-b, a CLI report configuration 415-c, and a CLI report configuration 415-d. Each CLI report configuration 415 may correspond to a CLI report configuration bit field in the MAC-CE, where each CLI report configuration bit field includes two bits of information. For example, the $S_0$ and $S_1$ may refer to the CLI report configuration 415-a, $S_2$ and $S_3$ may refer to the CLI report configuration 415-b, $S_4$ and $S_5$ may refer to the CLI report configuration 415-c, and $S_6$ and $S_7$ may refer to the CLI report configuration 415-d.

Logic values of the bits included in a CLI report configuration bit field may indicate a status (e.g., activation status or deactivation status) of the corresponding CLI report configuration. Further, the logic values of the bits included in the CLI report configuration bit field may indicate which version of the CLI report configuration. Each CLI report configuration 415 may include a default CLI report configuration and one or more altered versions of the default CLI report configuration. As an example, a first version of the CLI report configuration 415-a (e.g., default) may be associated with a first set of CLI measurement resources, a second version of the CLI report configuration 415-a may correspond to a first subset of the first set of CLI measurement resources, and a third version of the CLI report configuration 415-a may correspond to a second subset of the CLI measurement resources. As another example, a first version of the CLI report configuration 415-a may correspond to a set of resources that has a first quasi co-location (QCL) relationship, a second version of the CLI report configuration 415-a may correspond to a set of resources that has a second QCL relationship, and a third version of the CLI report configuration 415-a may correspond to a set of resources that has a third QCL relationship. Alternatively or additionally, there may other metrics that may be altered between different versions of a CLI report configuration such as frequency granularity (e.g., subband vs wideband).

Each CLI report configuration bit field includes two bits resulting in four possible logic values (e.g., 00, 01, 11, and 10). In some examples, if the logic value in the CLI report configuration bit field is 00, the corresponding CLI report configuration 415 may be deactivated. Alternatively, if the logic value in the CLI report configuration bit field is 01, 11, or 10, the corresponding CLI report configuration 415 may be activated. Further, depending on whether the logic value is 01, 11, or 10, a different version of the CLI report configuration may be activated. For example, if the logic value in the CLI report configuration field is 01, the UE 115-e may activate the first version of the CLI report configuration.

Figure 5:
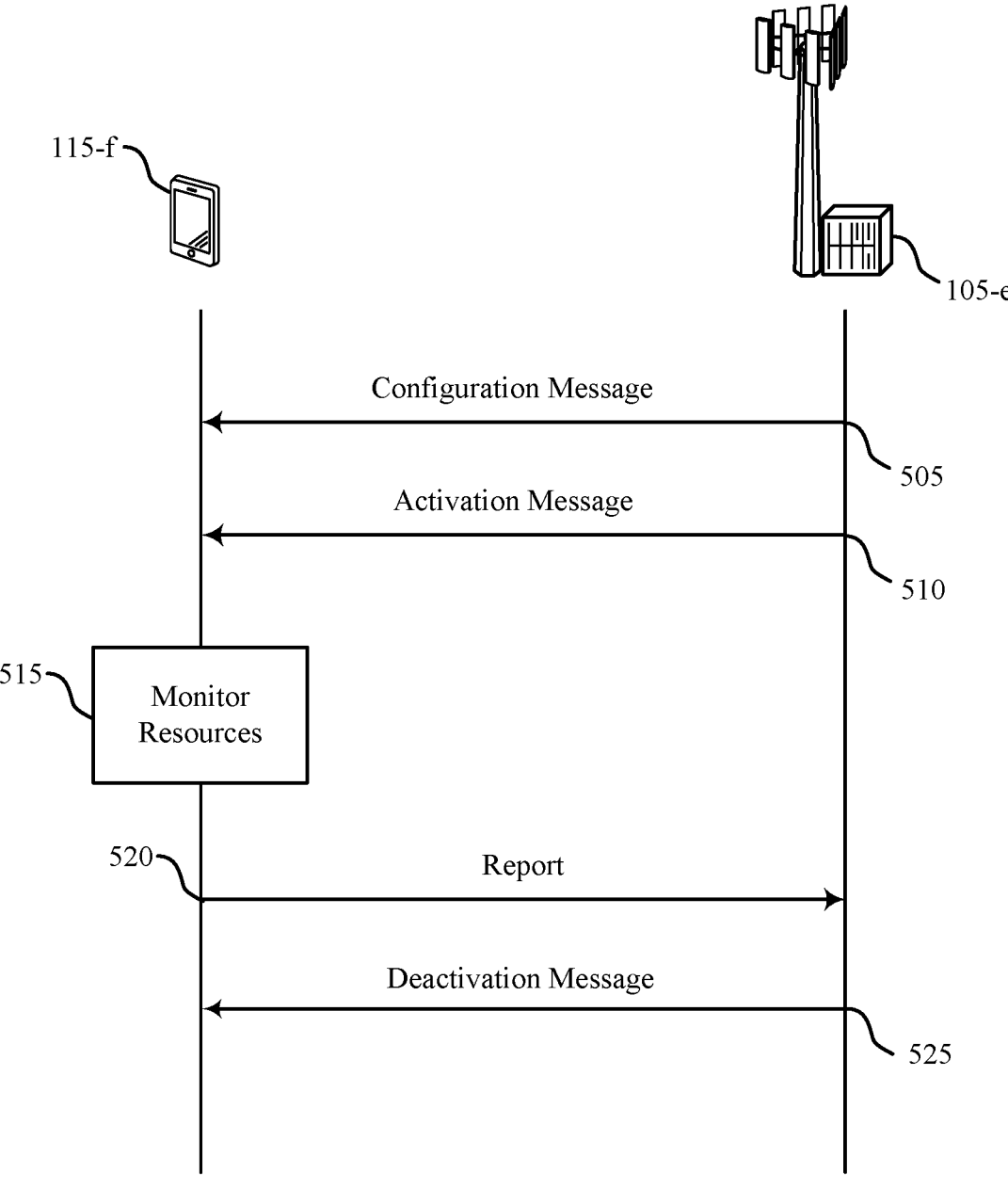
FIG. 5 illustrates an example of a process flow that supports joint activation of CLI measurement and reporting in accordance with one or more aspects of the present disclosure.

FIG. 5 illustrates an example of a process flow 500 that supports joint activation of CLI measurement and reporting in accordance with one or more aspects of the present disclosure. In some examples, the process flow 500 may implement or be implemented by aspects of a wireless communications system 100, a wireless communications system 200, a message format 300, and a message format 400. For example, the process flow 500 may be implemented by a UE 115-f and a network entity 105-e which may be examples of a UE 115 and a network entity 105 as described with reference to FIGS. 1 through 4. Alternative examples of the following may be implemented, where some steps are performed in a different order than described or are not performed at all. In some cases, steps may include additional features not mentioned below, or further steps may be added.

At 505, the UE 115-f may receive a configuration message from the network entity 105-e. The configuration message may indicate a configuration for measuring CLI during a first set of periodic occasions and for reporting one or more CLI measurements during a second set of periodic occasions. In some examples, the configuration may include an indication of one or more of a first periodicity associated with the first set of periodic occasions, a second periodicity associated with the second set of periodic occasions, a type of the one or more CLI measurement to be measured during the first set of periodic occasions (e.g., RSSI, RSPR, or signal-to-noise-plus-noise ratio (SINR)), one or more resources to be monitored during the first set of periodic occasion, a priority associated with the configuration. Additionally, the configuration message may include a second configuration for measuring CLI during a third set of periodic occasions and for reporting one or more CLI measurements during a fourth plurality of periodic occasions At 510, the UE 115-f may receive an activation message from the network entity 105-e. In some examples, the activation message may activate the configuration for measuring CLI during the first set periodic occasions and for reporting the one or more CLI measurements during the second set of periodic occasions. Additionally, the activation message may activate the second configuration. In some examples, the activation message may be included in a MAC-CE. The MAC-CE may include a set of bit field. In some examples, a first subset of the set of bit fields may correspond to the configuration. Additionally, a second subset of the set of bit fields may correspond to a channel state information report configuration.

At 515, the UE 115-f may monitor a resource during a periodic occasion of the first set of periodic occasions. In some examples, the UE 115-f may monitor the resource after a first duration from a slot where the activation message was received. In the case that the activation message activates the second configuration, the UE 115-f may monitor a resource or a second resource during a periodic occasion of the third set of periodic occasions.

At 520, the UE 115-f may transmit a report to the network entity 105-e during a periodic occasion of the second set of periodic occasions. The report may include the one or more CLI measurements (e.g., determined based on the monitoring the resource). In some examples, the UE 115-f may transmit the report after first time duration or a second time duration from a slot where the activation message was received. The first duration may be different from the second duration. In some examples, the report may include a CSI information report and the CSI report may include channel state feedback (CSF) that is determined using the one or more CLI measurements.

At 525, the UE 115-f may receive a deactivation message from the network entity 105-e. In some examples, the UE 115-f may deactivate the configuration for measuring CLI during the first set of periodic occasions and for reporting the one or more CLI measurements during the second set of periodic occasions.

Figure 6:
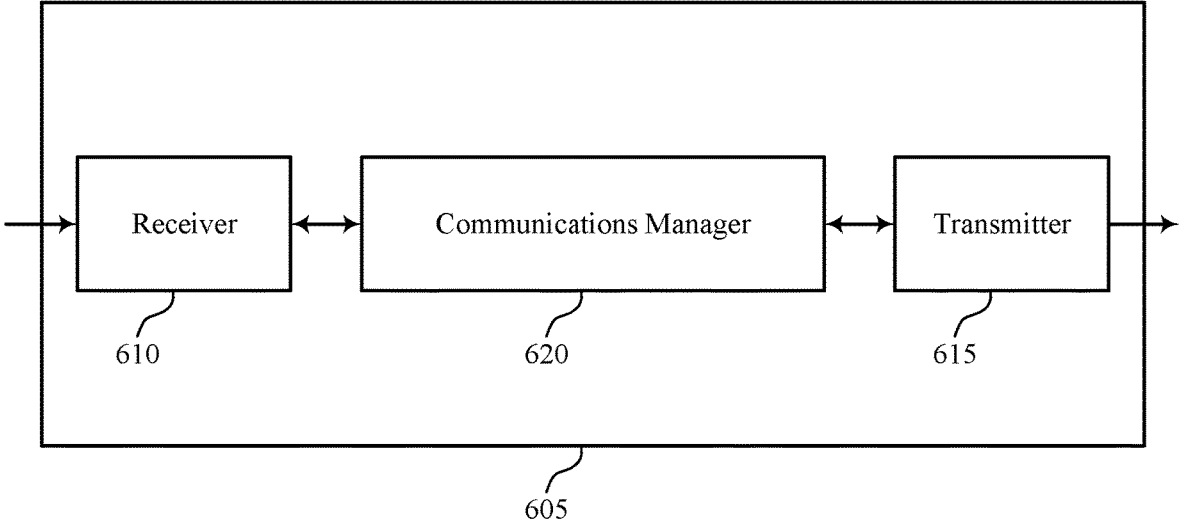
FIGS. 6 and 7 illustrate block diagrams of devices that support joint activation of CLI measurement and reporting in accordance with one or more aspects of the present disclosure.

FIG. 6 illustrates a block diagram 600 of a device 605 that supports joint activation of CLI measurement and reporting in accordance with one or more aspects of the present disclosure. The device 605 may be an example of aspects of a UE 115 as described herein. The device 605 may include a receiver 610, a transmitter 615, and a communications manager 620. The device 605 may also include one or more processors, memory coupled with the one or more processors, and instructions stored in the memory that are executable by the one or more processors to enable the one or more processors to perform joint activation of CLI measurement and reporting features as discussed herein. Each of these components may be in communication with one another (e.g., via one or more buses).

The receiver 610 may provide a means for receiving information such as packets, user data, control information, or any combination thereof associated with various information channels (e.g., control channels, data channels, information channels related to joint activation of CLI measurement and reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to joint activation of CLI measurement and reporting). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of joint activation of CLI measurement and reporting as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving, from a network entity, a first message indicating a configuration for measuring CLI during a first set of multiple periodic occasions and for reporting one or more CLI measurements during a second set of multiple periodic occasions. The communications manager 620 may be configured as or otherwise support a means for receiving, from the network entity, a second message activating the configuration for measuring CLI during the first set of multiple periodic occasions and for reporting the one or more CLI measurements during the second set of multiple periodic occasions. The communications manager 620 may be configured as or otherwise support a means for monitoring a resource during a periodic occasion of the first set of multiple periodic occasions based on the configuration and the second message. The communications manager 620 may be configured as or otherwise support a means for transmitting, to the network entity and based on the second message, a report including the one or more CLI measurements during a periodic occasion of the second set of multiple periodic occasions, where the one or more CLI measurements is based on monitoring the resource.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing and more efficient utilization of communication resources.

Figure 7:
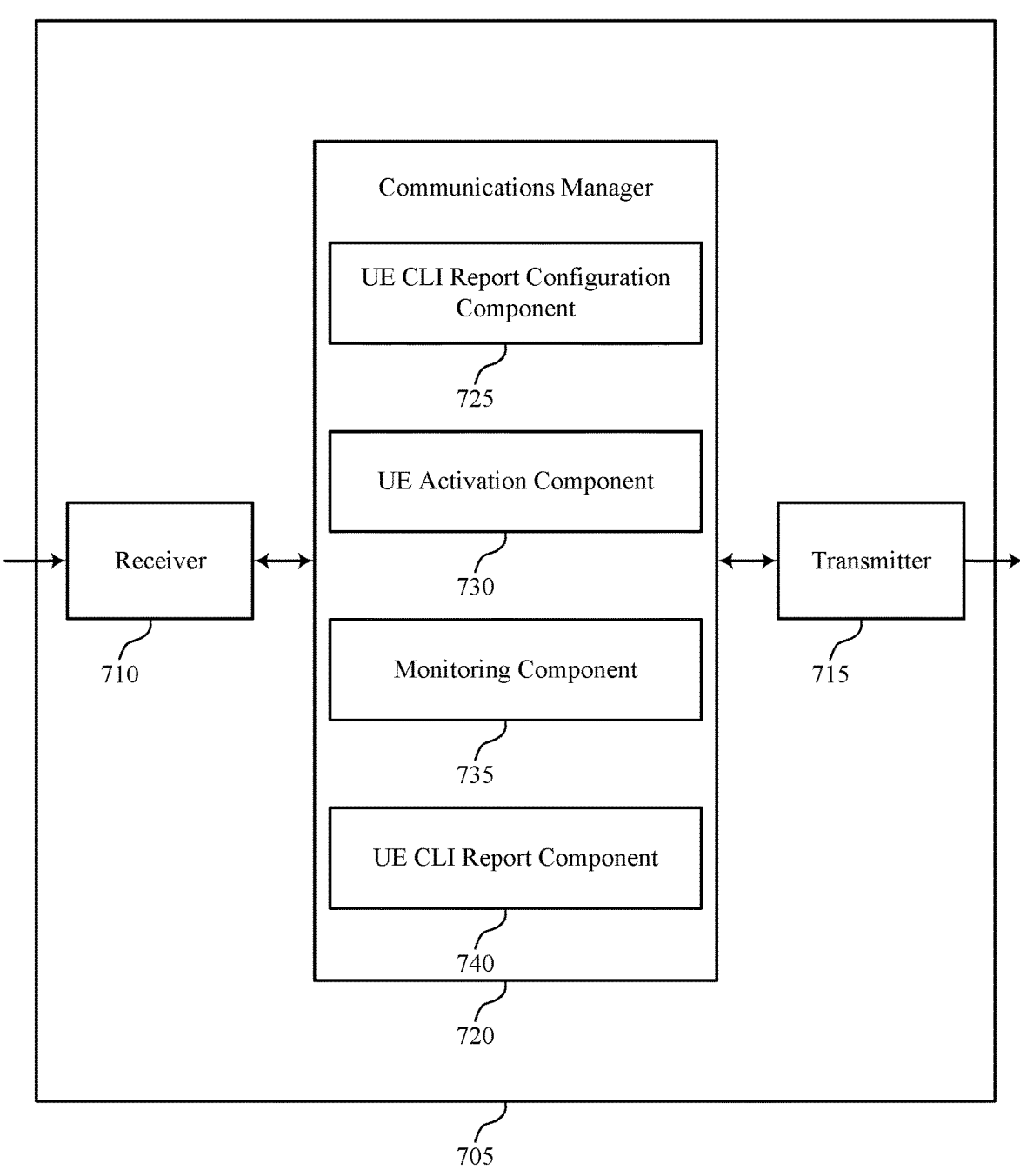

FIG. 7 illustrates a block diagram 700 of a device 705 that supports joint activation of CLI measurement and reporting in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to joint activation of CLI measurement and reporting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to joint activation of CLI measurement and reporting). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of joint activation of CLI measurement and reporting as described herein. For example, the communications manager 720 may include a UE CLI report configuration component 725, a UE activation component 730, a monitoring component 735, a UE CLI report component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The UE CLI report configuration component 725 may be configured as or otherwise support a means for receiving, from a network entity, a first message indicating a configuration for measuring CLI during a first set of multiple periodic occasions and for reporting one or more CLI measurements during a second set of multiple periodic occasions. The UE activation component 730 may be configured as or otherwise support a means for receiving, from the network entity, a second message activating the configuration for measuring CLI during the first set of multiple periodic occasions and for reporting the one or more CLI measurements during the second set of multiple periodic occasions. The monitoring component 735 may be configured as or otherwise support a means for monitoring a resource during a periodic occasion of the first set of multiple periodic occasions based on the configuration and the second message. The UE CLI report component 740 may be configured as or otherwise support a means for transmitting, to the network entity and based on the second message, a report including the one or more CLI measurements during a periodic occasion of the second set of multiple periodic occasions, where the one or more CLI measurements is based on monitoring the resource.

In some cases, the UE CLI report configuration component 725 and the UE activation component 730 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the UE CLI report configuration component 725 and the UE activation component 730 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
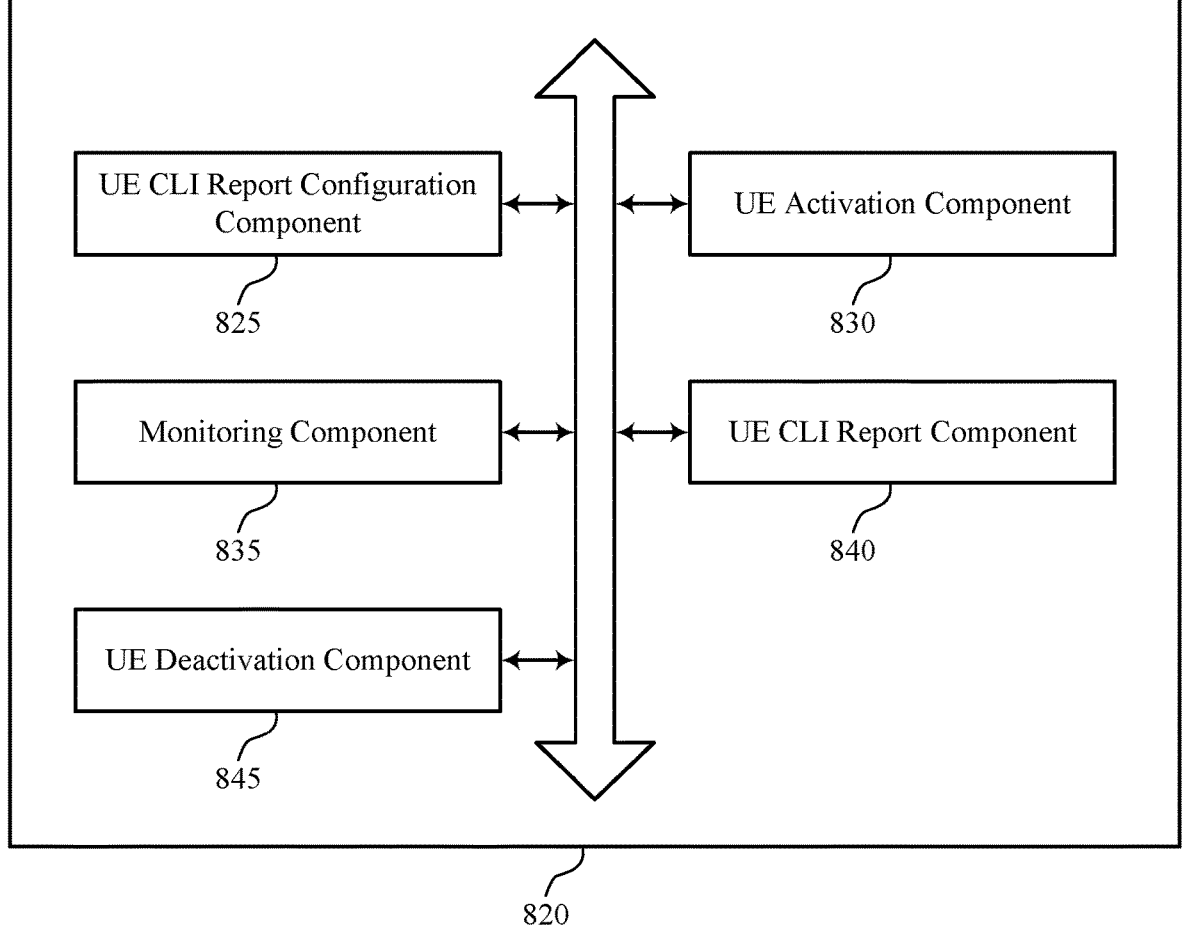
FIG. 8 illustrates a block diagram of a communications manager that supports joint activation of CLI measurement and reporting in accordance with one or more aspects of the present disclosure.

FIG. 8 illustrates a block diagram 800 of a communications manager 820 that supports joint activation of CLI measurement and reporting in accordance with one or more aspects of the present disclosure. The communications manager 820 may be an example of aspects of a communications manager 620, a communications manager 720, or both, as described herein. The communications manager 820, or various components thereof, may be an example of means for performing various aspects of joint activation of CLI measurement and reporting as described herein. For example, the communications manager 820 may include a UE CLI report configuration component 825, a UE activation component 830, a monitoring component 835, a UE CLI report component 840, a UE deactivation component 845, or any combination thereof. Each of these components may communicate, directly or indirectly, with one another (e.g., via one or more buses).

The communications manager 820 may support wireless communication at a UE in accordance with examples as disclosed herein. The UE CLI report configuration component 825 may be configured as or otherwise support a means for receiving, from a network entity, a first message indicating a configuration for measuring CLI during a first set of multiple periodic occasions and for reporting one or more CLI measurements during a second set of multiple periodic occasions. The UE activation component 830 may be configured as or otherwise support a means for receiving, from the network entity, a second message activating the configuration for measuring CLI during the first set of multiple periodic occasions and for reporting the one or more CLI measurements during the second set of multiple periodic occasions. The monitoring component 835 may be configured as or otherwise support a means for monitoring a resource during a periodic occasion of the first set of multiple periodic occasions based on the configuration and the second message. The UE CLI report component 840 may be configured as or otherwise support a means for transmitting, to the network entity and based on the second message, a report including the one or more CLI measurements during a periodic occasion of the second set of multiple periodic occasions, where the one or more CLI measurements is based on monitoring the resource.

In some examples, the UE deactivation component 845 may be configured as or otherwise support a means for receiving, from the network entity, a third message deactivating the configuration for measuring CLI during the first set of multiple periodic occasions and for reporting the one or more CLI measurements during the second set of multiple periodic occasions.

In some examples, to support monitoring the resource during the periodic occasion of the first set of multiple periodic occasions, the monitoring component 835 may be configured as or otherwise support a means for monitoring the resource after a first duration from a slot where the second message is received.

In some examples, to support transmitting the report during the periodic occasion of the second set of multiple periodic occasions, the UE CLI report component 840 may be configured as or otherwise support a means for transmitting the report after the first duration or a second duration from the slot where the second message is received, where the first duration is different from the second duration.

In some examples, the first message further includes a second configuration for measuring CLI during a third set of multiple periodic occasions and for reporting one or more second CLI measurements during a fourth set of multiple periodic occasion.

In some examples, the monitoring component 835 may be configured as or otherwise support a means for monitoring a second resource during a periodic occasion of the third set of multiple periodic occasions based on the second message activating the second configuration.

In some examples, the monitoring component 835 may be configured as or otherwise support a means for monitoring the resource during a periodic occasion of the third set of multiple periodic occasions based on the second message activating the second configuration. In some examples, the first message includes a MAC-CE, the MAC-CE including a set of bit fields.

In some examples, a first subset of the set of bit fields corresponds to the configuration. In some examples, monitoring the resource is based on a logic value of each respective bit field of the first subset. In some examples, a second subset of the set of bit fields corresponds to a channel state information report configuration.

In some examples, to support transmitting the report during the periodic occasion of the second set of multiple periodic occasions, the UE CLI report component 840 may be configured as or otherwise support a means for transmitting a channel state information report, the channel state information report including channel state feedback based on the one or more CLI measurements.

In some examples, the configuration includes an indication of a first periodicity associated with the first set of multiple periodic occasions, a second periodicity associated with the second set of multiple periodic occasions, one or more resources to be monitored during the first set of multiple periodic occasions, a type of the one or more CLI measurements to include in the report, a priority associated with the configuration, or a combination thereof.

In some cases, the UE CLI report configuration component 825, the UE activation component 830, the monitoring component 835, the UE CLI report component 840, and the UE deactivation component 845 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the UE CLI report configuration component 825, the UE activation component 830, the monitoring component 835, the UE CLI report component 840, and the UE deactivation component 845 discussed herein.

Figure 9:
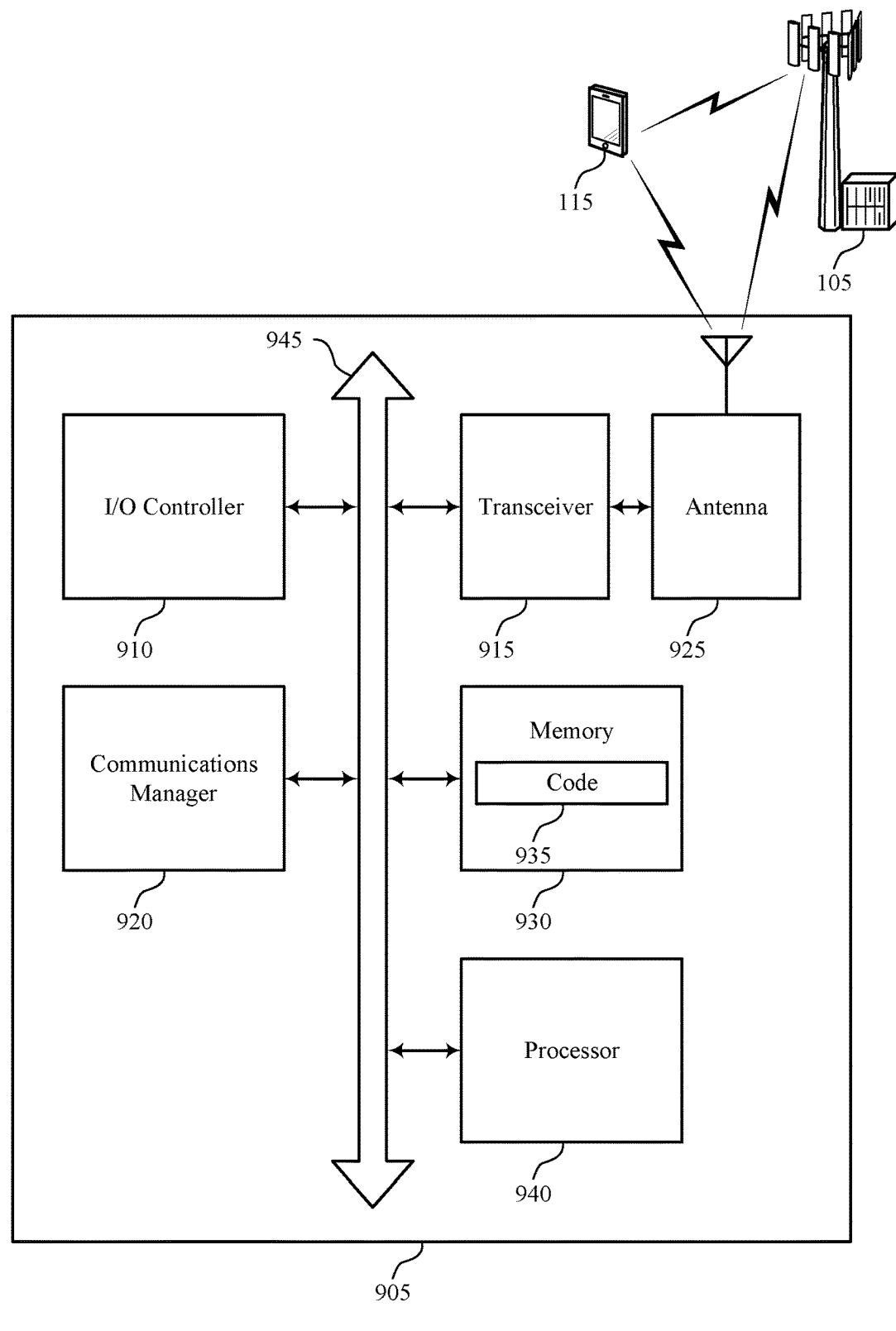
FIG. 9 illustrates a diagram of a system including a device that supports joint activation of CLI measurement and reporting in accordance with one or more aspects of the present disclosure.

FIG. 9 illustrates a diagram of a system 900 including a device 905 that supports joint activation of CLI measurement and reporting in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting joint activation of CLI measurement and reporting). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a network entity, a first message indicating a configuration for measuring CLI during a first set of multiple periodic occasions and for reporting one or more CLI measurements during a second set of multiple periodic occasions. The communications manager 920 may be configured as or otherwise support a means for receiving, from the network entity, a second message activating the configuration for measuring CLI during the first set of multiple periodic occasions and for reporting the one or more CLI measurements during the second set of multiple periodic occasions. The communications manager 920 may be configured as or otherwise support a means for monitoring a resource during a periodic occasion of the first set of multiple periodic occasions based on the configuration and the second message. The communications manager 920 may be configured as or otherwise support a means for transmitting, to the network entity and based on the second message, a report including the one or more CLI measurements during a periodic occasion of the second set of multiple periodic occasions, where the one or more CLI measurements is based on monitoring the resource.

By including or configuring the communications manager 920 in accordance with examples as described herein, the device 905 may support techniques for reduced latency and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of joint activation of CLI measurement and reporting as described herein, or the processor 940 and the memory 930 may be otherwise configured to perform or support such operations.

FIG. 10 illustrates a block diagram 1000 of a device 1005 that supports joint activation of CLI measurement and reporting in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include may also include one or more processors, memory coupled with the one or more processors, and instructions stored in the memory that are executable by the one or more processors to enable the one or more processors to perform joint activation of CLI measurement and reporting features as discussed herein. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of joint activation of CLI measurement and reporting as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting a first message indicating a configuration for measuring CLI during a first set of multiple periodic occasions and for reporting one or more CLI measurements during a second set of multiple periodic occasions. The communications manager 1020 may be configured as or otherwise support a means for transmitting a second message activating the configuration for measuring CLI during the first set of multiple periodic occasions and for reporting the one or more CLI measurements during the second set of multiple periodic occasions. The communications manager 1020 may be configured as or otherwise support a means for receiving, based on transmitting the second message, a report including the one or more CLI measurements during a periodic occasion of the second set of multiple periodic occasions.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing and more efficient utilization of communication resources.

FIG. 11 illustrates a block diagram 1100 of a device 1105 that supports joint activation of CLI measurement and reporting in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of joint activation of CLI measurement and reporting as described herein. For example, the communications manager 1120 may include a CLI report configuration component 1125, an activation component 1130, a CLI report component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The CLI report configuration component 1125 may be configured as or otherwise support a means for transmitting a first message indicating a configuration for measuring CLI during a first set of multiple periodic occasions and for reporting one or more CLI measurements during a second set of multiple periodic occasions. The activation component 1130 may be configured as or otherwise support a means for transmitting a second message activating the configuration for measuring CLI during the first set of multiple periodic occasions and for reporting the one or more CLI measurements during the second set of multiple periodic occasions. The CLI report component 1135 may be configured as or otherwise support a means for receiving, based on transmitting the second message, a report including the one or more CLI measurements during a periodic occasion of the second set of multiple periodic occasions.

In some cases, the CLI report configuration component 1125 and the activation component 1130 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the CLI report configuration component 1125 and the activation component 1130 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

FIG. 12 illustrates a block diagram 1200 of a communications manager 1220 that supports joint activation of CLI measurement and reporting in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of joint activation of CLI measurement and reporting as described herein. For example, the communications manager 1220 may include a CLI report configuration component 1225, an activation component 1230, a CLI report component 1235, a deactivation component 1240, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The CLI report configuration component 1225 may be configured as or otherwise support a means for transmitting a first message indicating a configuration for measuring CLI during a first set of multiple periodic occasions and for reporting one or more CLI measurements during a second set of multiple periodic occasions. The activation component 1230 may be config-ured as or otherwise support a means for transmitting a second message activating the configuration for measuring CLI during the first set of multiple periodic occasions and for reporting the one or more CLI measurements during the second set of multiple periodic occasions. The CLI report component 1235 may be configured as or otherwise support a means for receiving, based on transmitting the second message, a report including the one or more CLI measure-ments during a periodic occasion of the second set of multiple periodic occasions.

In some examples, the deactivation component 1240 may be configured as or otherwise support a means for transmit-ting a third message deactivating the configuration for measuring CLI during the first set of multiple periodic occasions and for reporting the one or more CLI measure-ments during the second set of multiple periodic occasions.

In some examples, the first message includes a MAC-CE, the MAC-CE including a set of bit fields. In some examples, a first subset of the set of bit fields corresponds to the configuration. In some examples, a second subset of the set of bit fields corresponds to a channel state information report configuration.

In some examples, to support receiving the report during the periodic occasion of the second set of multiple periodic occasions, the CLI report component 1235 may be config-ured as or otherwise support a means for receiving a channel state information report, the channel state information report including channel state feedback based on the one or more CLI measurements.

In some examples, the configuration includes an indica-tion of a first periodicity associated with the first set of multiple periodic occasions, a second periodicity associated with the second set of multiple periodic occasions, one or more resources to be monitored during the first set of multiple periodic occasions, a type of the one or more CLI measurements to include in the report, a priority associated with the configuration, or a combination thereof.

In some cases, the CLI report configuration component 1225, the activation component 1230, the CLI report com-ponent 1235, and the deactivation component 1240 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the CLI report configuration component 1225, the activation component 1230, the CLI report component 1235, and the deactivation component 1240 discussed herein.

FIG. 13 illustrates a diagram of a system 1300 including a device 1305 that supports joint activation of CLI mea-surement and reporting in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combi-nation thereof, which may include communications over one or more wired interfaces, over one or more wireless inter-faces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., opera-tively, communicatively, functionally, electronically, electri-cally) via one or more buses (e.g., a bus 1340).

The transceiver 1310 may support bi-directional commu-nications via wired links, wireless links, or both as described herein. In some examples, the transceiver 1310 may include a wired transceiver and may communicate bi-directionally with another wired transceiver. Additionally, or alterna-tively, in some examples, the transceiver 1310 may include a wireless transceiver and may communicate bi-direction-ally with another wireless transceiver. In some examples, the device 1305 may include one or more antennas 1315, which may be capable of transmitting or receiving wireless trans-missions (e.g., concurrently). The transceiver 1310 may also include a modem to modulate signals, to provide the modu-lated signals for transmission (e.g., by one or more antennas 1315, by a wired transmitter), to receive modulated signals (e.g., from one or more antennas 1315, from a wired receiver), and to demodulate signals. In some implementa-tions, the transceiver 1310 may include one or more inter-faces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementa-tions, the transceiver 1310 may include or be configured for coupling with one or more processors or memory compo-nents that are operable to perform or support operations based on received or obtained information or signals, or to generate information or other signals for transmission or other outputting, or any combination thereof. In some imple-mentations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support com-munications via one or more communications links (e.g., a communication link 125, a backhaul communication link 120, a midhaul communication link 162, a fronthaul com-munication link 168).

The memory 1325 may include RAM and ROM. The memory 1325 may store computer-readable, computer-ex-ecutable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting joint activation of CLI measurement and reporting). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting a first message indicating a configuration for measuring CLI during a first set of multiple periodic occasions and for reporting one or more CLI measurements during a second set of multiple periodic occasions. The communications manager 1320 may be configured as or otherwise support a means for transmitting a second message activating the configuration for measuring CLI during the first set of multiple periodic occasions and for reporting the one or more CLI measurements during the second set of multiple periodic occasions. The communications manager 1320 may be configured as or otherwise support a means for receiving, based on transmitting the second message, a report including the one or more CLI measurements during a periodic occasion of the second set of multiple periodic occasions.

By including or configuring the communications manager 1320 in accordance with examples as described herein, the device 1305 may support techniques for reduced latency and more efficient utilization of communication resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of joint activation of CLI measurement and reporting as described herein, or the processor 1335 and the memory 1325 may be otherwise configured to perform or support such operations.

FIG. 14 illustrates a flowchart illustrating a method 1400 that supports joint activation of CLI measurement and reporting in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, a first message indicating a configuration for measuring CLI during a first set of multiple periodic occasions and for reporting one or more CLI measurements during a second set of multiple periodic occasions. The operations of 1405 may be performed in accordance with examples as disclosed herein. In some examples, aspects of the operations of 1405 may be performed by a UE CLI report configuration component 825 as described with reference to FIG. 8.

At 1410, the method may include receiving, from the network entity, a second message activating the configuration for measuring CLI during the first set of multiple periodic occasions and for reporting the one or more CLI measurements during the second set of multiple periodic occasions. The operations of 1410 may be performed in accordance with examples as disclosed herein. In some examples, aspects of the operations of 1410 may be performed by a UE activation component 830 as described with reference to FIG. 8.

At 1415, the method may include monitoring a resource during a periodic occasion of the first set of multiple periodic occasions based on the configuration and the second message. The operations of 1415 may be performed in accordance with examples as disclosed herein. In some examples, aspects of the operations of 1415 may be performed by a monitoring component 835 as described with reference to FIG. 8.

At 1420, the method may include transmitting, to the network entity and based on the second message, a report including the one or more CLI measurements during a periodic occasion of the second set of multiple periodic occasions, where the one or more CLI measurements is based on monitoring the resource. The operations of 1420 may be performed in accordance with examples as disclosed herein. In some examples, aspects of the operations of 1420 may be performed by a UE CLI report component 840 as described with reference to FIG. 8.

FIG. 15 illustrates a flowchart illustrating a method 1500 that supports joint activation of CLI measurement and reporting in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, a first message indicating a configuration for measuring CLI during a first set of multiple periodic occasions and for reporting one or more CLI measurements during a second set of multiple periodic occasions. The operations of 1505 may be performed in accordance with examples as disclosed herein. In some examples, aspects of the operations of 1505 may be performed by a UE CLI report configuration component 825 as described with reference to FIG. 8.

At 1510, the method may include receiving, from the network entity, a second message activating the configuration for measuring CLI during the first set of multiple periodic occasions and for reporting the one or more CLI measurements during the second set of multiple periodic occasions. The operations of 1510 may be performed in accordance with examples as disclosed herein. In some examples, aspects of the operations of 1510 may be performed by a UE activation component 830 as described with reference to FIG. 8.

At 1515, the method may include monitoring a resource during a periodic occasion of the first set of multiple periodic occasions based on the configuration and the second message. The operations of 1515 may be performed in accordance with examples as disclosed herein. In some examples, aspects of the operations of 1515 may be performed by a monitoring component 835 as described with reference to FIG. 8.

At 1520, the method may include transmitting, to the network entity and based on the second message, a report including the one or more CLI measurements during a periodic occasion of the second set of multiple periodic occasions, where the one or more CLI measurements is based on monitoring the resource. The operations of 1520 may be performed in accordance with examples as disclosed herein. In some examples, aspects of the operations of 1520 may be performed by a UE CLI report component 840 as described with reference to FIG. 8.

At 1525, the method may include receiving, from the network entity, a third message deactivating the configuration for measuring CLI during the first set of multiple periodic occasions and for reporting the one or more CLI measurements during the second set of multiple periodic occasions. The operations of 1525 may be performed in accordance with examples as disclosed herein. In some examples, aspects of the operations of 1525 may be performed by a UE deactivation component 845 as described with reference to FIG. 8.

FIG. 16 illustrates a flowchart illustrating a method 1600 that supports joint activation of CLI measurement and reporting in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a first message indicating a configuration for measuring CLI during a first set of multiple periodic occasions and for reporting one or more CLI measurements during a second set of multiple periodic occasions. The operations of 1605 may be performed in accordance with examples as disclosed herein. In some examples, aspects of the operations of 1605 may be performed by a CLI report configuration component 1225 as described with reference to FIG. 12.

At 1610, the method may include transmitting a second message activating the configuration for measuring CLI during the first set of multiple periodic occasions and for reporting the one or more CLI measurements during the second set of multiple periodic occasions. The operations of 1610 may be performed in accordance with examples as disclosed herein. In some examples, aspects of the operations of 1610 may be performed by an activation component 1230 as described with reference to FIG. 12.

At 1615, the method may include receiving, based on transmitting the second message, a report including the one or more CLI measurements during a periodic occasion of the second set of multiple periodic occasions. The operations of 1615 may be performed in accordance with examples as disclosed herein. In some examples, aspects of the operations of 1615 may be performed by a CLI report component 1235 as described with reference to FIG. 12.

FIG. 17 illustrates a flowchart illustrating a method 1700 that supports joint activation of CLI measurement and reporting in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a first message indicating a configuration for measuring CLI during a first set of multiple periodic occasions and for reporting one or more CLI measurements during a second set of multiple periodic occasions. The operations of 1705 may be performed in accordance with examples as disclosed herein. In some examples, aspects of the operations of 1705 may be performed by a CLI report configuration component 1225 as described with reference to FIG. 12.

At 1710, the method may include transmitting a second message activating the configuration for measuring CLI during the first set of multiple periodic occasions and for reporting the one or more CLI measurements during the second set of multiple periodic occasions. The operations of 1710 may be performed in accordance with examples as disclosed herein. In some examples, aspects of the operations of 1710 may be performed by an activation component 1230 as described with reference to FIG. 12.

At 1715, the method may include receiving, based on transmitting the second message, a report including the one or more CLI measurements during a periodic occasion of the second set of multiple periodic occasions. The operations of 1715 may be performed in accordance with examples as disclosed herein. In some examples, aspects of the operations of 1715 may be performed by a CLI report component 1235 as described with reference to FIG. 12.

At 1720, the method may include transmitting a third message deactivating the configuration for measuring CLI during the first set of multiple periodic occasions and for reporting the one or more CLI measurements during the second set of multiple periodic occasions. The operations of 1720 may be performed in accordance with examples as disclosed herein. In some examples, aspects of the operations of 1720 may be performed by a deactivation component 1240 as described with reference to FIG. 12.

The following provides an overview of aspects of the present disclosure:

Aspect 1: A method for wireless communication at a UE, comprising: receiving, from a network entity, a first message indicating a configuration for measuring CLI during a first plurality of periodic occasions and for reporting one or more CLI measurements during a second plurality of periodic occasions; receiving, from the network entity, a second message activating the configuration for measuring CLI during the first plurality of periodic occasions and for reporting the one or more CLI measurements during the second plurality of periodic occasions; monitoring a resource during a periodic occasion of the first plurality of periodic occasions based at least in part on the configuration and the second message; and transmitting, to the network entity and based at least in part on the second message, a report comprising the one or more CLI measurements during a periodic occasion of the second plurality of periodic occasions, wherein the one or more CLI measurements is based at least in part on monitoring the resource.

Aspect 2: The method of aspect 1, further comprising: receiving, from the network entity, a third message deactivating the configuration for measuring CLI during the first plurality of periodic occasions and for reporting the one or more CLI measurements during the second plurality of periodic occasions.

Aspect 3: The method of any of aspects 1 through 2, wherein monitoring the resource during the periodic occasion of the first plurality of periodic occasions comprises: monitoring the resource after a first duration from a slot where the second message is received.

Aspect 4: The method of aspect 3, wherein transmitting the report during the periodic occasion of the second plurality of periodic occasions comprises: transmitting the report after the first duration or a second duration from the slot where the second message is received, wherein the first duration is different from the second duration.

Aspect 5: The method of any of aspects 1 through 4, wherein the first message further comprises a second configuration for measuring CLI during a third plurality of periodic occasions and for reporting one or more second CLI measurements during a fourth plurality of periodic occasion.

Aspect 6: The method of aspect 5, further comprising: monitoring a second resource during a periodic occasion of the third plurality of periodic occasions based at least in part on the second message activating the second configuration.

Aspect 7: The method of aspect 5, further comprising: monitoring the resource during a periodic occasion of the third plurality of periodic occasions based at least in part on the second message activating the second configuration.

Aspect 8: The method of any of aspects 1 through 7, wherein the first message comprises a MAC-CE, the MAC-CE comprising a set of bit fields.

Aspect 9: The method of aspect 8, wherein a first subset of the set of bit fields corresponds to the configuration, monitoring the resource is based at least in part on a logic value of each respective bit field of the first subset.

Aspect 10: The method of any of aspects 8 through 9, wherein a second subset of the set of bit fields corresponds to a CSI report configuration.

Aspect 11: The method of any of aspects 1 through 10, wherein transmitting the report during the periodic occasion of the second plurality of periodic occasions comprises: transmitting a CSI report, the CSI report comprising CSF based at least in part on the one or more CLI measurements.

Aspect 12: The method of any of aspects 1 through 11, wherein the configuration comprises an indication of a first periodicity associated with the first plurality of periodic occasions, a second periodicity associated with the second plurality of periodic occasions, one or more resources to be monitored during the first plurality of periodic occasions, a type of the one or more CLI measurements to include in the report, a priority associated with the configuration, or a combination thereof.

Aspect 13: A method for wireless communication at a network entity, comprising: transmitting a first message indicating a configuration for measuring CLI during a first plurality of periodic occasions and for reporting one or more CLI measurements during a second plurality of periodic occasions; transmitting a second message activating the configuration for measuring CLI during the first plurality of periodic occasions and for reporting the one or more CLI measurements during the second plurality of periodic occasions; and receiving, based at least in part on transmitting the second message, a report comprising the one or more CLI measurements during a periodic occasion of the second plurality of periodic occasions.

Aspect 14: The method of aspect 13, further comprising: transmitting a third message deactivating the configuration for measuring CLI during the first plurality of periodic occasions and for reporting the one or more CLI measurements during the second plurality of periodic occasions.

Aspect 15: The method of any of aspects 13 through 14, wherein the first message comprises a MAC-CE, the MAC-CE comprising a set of bit fields.

Aspect 16: The method of aspect 15, wherein a first subset of the set of bit fields corresponds to the configuration.

Aspect 17: The method of any of aspects 15 through 16, wherein a second subset of the set of bit fields corresponds to a CSI report configuration.

Aspect 18: The method of any of aspects 13 through 17, wherein receiving the report during the periodic occasion of the second plurality of periodic occasions comprises: receiving a CSI report, the CSI report comprising CSF based at least in part on the one or more CLI measurements.

Aspect 19: The method of any of aspects 13 through 18, wherein the configuration comprises an indication of a first periodicity associated with the first plurality of periodic occasions, a second periodicity associated with the second plurality of periodic occasions, one or more resources to be monitored during the first plurality of periodic occasions, a type of the one or more CLI measurements to include in the report, a priority associated with the configuration, or a combination thereof.

Aspect 20: An apparatus for wireless communication at a UE, comprising a processor; memory coupled with the processor; and instructions stored in the memory and executable by the processor to cause the apparatus to perform a method of any of aspects 1 through 12.

Aspect 21: An apparatus for wireless communication at a UE, comprising at least one means for performing a method of any of aspects 1 through 12.

Aspect 22: A non-transitory computer-readable medium storing code for wireless communication at a UE, the code comprising instructions executable by a processor to perform a method of any of aspects 1 through 12.

Aspect 23: An apparatus for wireless communication at a network entity, comprising a processor; memory coupled with the processor; and instructions stored in the memory and executable by the processor to cause the apparatus to perform a method of any of aspects 13 through 19.

Aspect 24: An apparatus for wireless communication at a network entity, comprising at least one means for performing a method of any of aspects 13 through 19.

Aspect 25: A non-transitory computer-readable medium storing code for wireless communication at a network entity, the code comprising instructions executable by a processor to perform a method of any of aspects 13 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   memory coupled with the one or more processors; and
   instructions stored in the memory and executable by the one or more processors to cause the apparatus to:
      receive a first message indicating a configuration for measuring cross-link interference during a first plurality of periodic occasions and for reporting one or more cross-link interference measurements during a second plurality of periodic occasions;

receive a second message activating the configuration for measuring cross-link interference during the first plurality of periodic occasions and for reporting the one or more cross-link interference measurements during the second plurality of periodic occasions;
      monitor a resource during a periodic occasion of the first plurality of periodic occasions based at least in part on the configuration and the second message, wherein the resource is monitored after a first duration from a slot where the second message is received; and
      transmit, based at least in part on the second message, a report comprising the one or more cross-link interference measurements during a periodic occasion of the second plurality of periodic occasions, wherein the one or more cross-link interference measurements is based at least in part on monitoring the resource.

2. The apparatus of claim 1, wherein the instructions are further executable by the one or more processors to cause the apparatus to:
   receive a third message deactivating the configuration for measuring cross-link interference during the first plurality of periodic occasions and for reporting the one or more cross-link interference measurements during the second plurality of periodic occasions.

3. The apparatus of claim 1, wherein the instructions are further executable by the one or more processors to transmit the report during the periodic occasion of the second plurality of periodic occasions by being executable by the one or more processors to:
   transmit the report after the first duration or a second duration from the slot where the second message is received, wherein the first duration is different from the second duration.

4. The apparatus of claim 1, wherein the first message further comprises a second configuration for measuring cross-link interference during a third plurality of periodic occasions and for reporting one or more second cross-link interference measurements during a fourth plurality of periodic occasion.

5. The apparatus of claim 4, wherein the instructions are further executable by the one or more processors to cause the apparatus to:
   monitor a second resource during a periodic occasion of the third plurality of periodic occasions based at least in part on the second message activating the second configuration.

6. The apparatus of claim 4, wherein the instructions are further executable by the one or more processors to cause the apparatus to:
   monitor the resource during a periodic occasion of the third plurality of periodic occasions based at least in part on the second message activating the second configuration.

7. The apparatus of claim 1, wherein the second message comprises a medium access control control element, the medium access control control element comprising a set of bit fields.

8. The apparatus of claim 7, wherein a first subset of the set of bit fields corresponds to the configuration, and wherein monitoring the resource is based at least in part on a logic value of each respective bit field of the first subset.

9. The apparatus of claim 7, wherein a second subset of the set of bit fields corresponds to a channel state information report configuration.

10. The apparatus of claim 1, wherein the instructions are further executable by the one or more processors to transmit the report during the periodic occasion of the second plurality of periodic occasions by being executable by the one or more processors to:

transmit a channel state information report, the channel state information report comprising channel state feedback based at least in part on the one or more cross-link interference measurements.

11. The apparatus of claim 1, wherein the configuration comprises an indication of a first periodicity associated with the first plurality of periodic occasions, a second periodicity associated with the second plurality of periodic occasions, one or more resources to be monitored during the first plurality of periodic occasions, a type of the one or more cross-link interference measurements to include in the report, a priority associated with the configuration, or a combination thereof.

12. An apparatus for wireless communication at a network entity, comprising:

one or more processors;

memory coupled with the one or more processors; and instructions stored in the memory and executable by the one or more processors to cause the apparatus to:

transmit a first message indicating a configuration for measuring cross-link interference during a first plurality of periodic occasions and for reporting one or more cross-link interference measurements during a second plurality of periodic occasions;

transmit a second message comprising a set of bit fields for activating the configuration for measuring cross-link interference during the first plurality of periodic occasions and for reporting the one or more cross-link interference measurements during the second plurality of periodic occasions, wherein a first subset of the set of bit fields corresponds to the configuration; and receive, based at least in part on transmitting the second message, a report comprising the one or more cross-link interference measurements during a periodic occasion of the second plurality of periodic occasions.

13. The apparatus of claim 12, wherein the instructions are further executable by the one or more processors to cause the apparatus to:

transmit a third message deactivating the configuration for measuring cross-link interference during the first plurality of periodic occasions and for reporting the one or more cross-link interference measurements during the second plurality of periodic occasions.

14. The apparatus of claim 12, wherein the second message comprises a medium access control control element, the medium access control control element comprising the set of bit fields.

15. The apparatus of claim 14, wherein a second subset of the set of bit fields corresponds to a channel state information report configuration.

16. The apparatus of claim 12, wherein the instructions are further executable by the one or more processors to receive the report during the periodic occasion of the second plurality of periodic occasions by being executable by the one or more processors to:

receive a channel state information report, the channel state information report comprising channel state feedback based at least in part on the one or more cross-link interference measurements.

17. The apparatus of claim 12, wherein the configuration comprises an indication of a first periodicity associated with the first plurality of periodic occasions, a second periodicity associated with the second plurality of periodic occasions, one or more resources to be monitored during the first plurality of periodic occasions, a type of the one or more cross-link interference measurements to include in the report, a priority associated with the configuration, or a combination thereof.

18. A method for wireless communication at a user equipment (UE), comprising:

receiving a first message indicating a configuration for measuring cross-link interference during a first plurality of periodic occasions and for reporting one or more cross-link interference measurements during a second plurality of periodic occasions;

receiving a second message activating the configuration for measuring cross-link interference during the first plurality of periodic occasions and for reporting the one or more cross-link interference measurements during the second plurality of periodic occasions;

monitoring a resource during a periodic occasion of the first plurality of periodic occasions based at least in part on the configuration and the second message, wherein the resource is monitored after a first duration from a slot where the second message is received; and transmitting, based at least in part on the second message, a report comprising the one or more cross-link interference measurements during a periodic occasion of the second plurality of periodic occasions, wherein the one or more cross-link interference measurements is based at least in part on monitoring the resource.

19. The method of claim 18, further comprising:

receiving a third message deactivating the configuration for measuring cross-link interference during the first plurality of periodic occasions and for reporting the one or more cross-link interference measurements during the second plurality of periodic occasions.

20. The method of claim 18, wherein transmitting the report during the periodic occasion of the second plurality of periodic occasions comprises:

transmitting the report after the first duration or a second duration from the slot where the second message is received, wherein the first duration is different from the second duration.

21. The method of claim 18, wherein the first message further comprises a second configuration for measuring cross-link interference during a third plurality of periodic occasions and for reporting one or more second cross-link interference measurements during a fourth plurality of periodic occasion.

22. The method of claim 18, wherein the first message comprises a medium access control control element, the medium access control control element comprising a set of bit fields.

23. The method of claim 18, wherein transmitting the report during the periodic occasion of the second plurality of periodic occasions comprises:

transmitting a channel state information report, the channel state information report comprising channel state feedback based at least in part on the one or more cross-link interference measurements.

24. A method for wireless communication at a network entity, comprising:

transmitting a first message indicating a configuration for measuring cross-link interference during a first plurality of periodic occasions and for reporting one or more cross-link interference measurements during a second plurality of periodic occasions;

transmitting a second message comprising a set of bit fields for activating the configuration for measuring cross-link interference during the first plurality of periodic occasions and for reporting the one or more cross-link interference measurements during the second plurality of periodic occasions, wherein a first subset of the set of bit fields corresponds to the configuration; and receiving, based at least in part on transmitting the second message, a report comprising the one or more cross-link interference measurements during a periodic occasion of the second plurality of periodic occasions.

25. The method of claim 24, further comprising:
transmitting a third message deactivating the configuration for measuring cross-link interference during the first plurality of periodic occasions and for reporting the one or more cross-link interference measurements during the second plurality of periodic occasions.

26. The method of claim 24, wherein the first message comprises a medium access control control element, the medium access control control element comprising a set of bit fields.

27. The method of claim 24, wherein receiving the report during the periodic occasion of the second plurality of periodic occasions comprises:
receiving a channel state information report, the channel state information report comprising channel state feedback based at least in part on the one or more cross-link interference measurements.

* * * * *